(12) United States Patent
Ribeiro et al.

(10) Patent No.: US 10,419,523 B2
(45) Date of Patent: *Sep. 17, 2019

(54) DATA COMMUNICATION USING VEHICLE DATA CARRIERS

(71) Applicant: General Electric Company, Schenectady, NY (US)

(72) Inventors: Marcelo Blois Ribeiro, Rio de Janeiro (BR); Fabio Lattario Fonseca, Rio de Janeiro (BR); Isela Macia Bertrán, Rio de Janeiro (BR); Felipe Miranda Costa, Rio de Janeiro (BR); Marcio Egydio Rondon, Rio de Janeiro (BR)

(73) Assignee: General Electric Company, Schenectady, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/687,282

(22) Filed: Aug. 25, 2017

(65) Prior Publication Data

US 2017/0374133 A1 Dec. 28, 2017

Related U.S. Application Data

(63) Continuation of application No. 14/701,764, filed on May 1, 2015, now Pat. No. 9,756,116.

(51) Int. Cl.
*H04W 40/02* (2009.01)
*H04L 29/08* (2006.01)
(Continued)

(52) U.S. Cl.
CPC .............. *H04L 67/06* (2013.01); *H04L 67/12* (2013.01); *H04W 4/046* (2013.01); *H04W 40/02* (2013.01);
(Continued)

(58) Field of Classification Search
CPC ..... H04W 40/12; H04W 40/02; H04W 40/06; H04W 40/20; H04W 40/30; H04W 40/34;
(Continued)

(56) References Cited

U.S. PATENT DOCUMENTS

| 4,313,228 A | 1/1982 | Berstein |
| 6,580,983 B2 | 6/2003 | Laguer-Diaz et al. |

(Continued)

FOREIGN PATENT DOCUMENTS

EP        2257108 A1    12/2010

OTHER PUBLICATIONS

U.S. Appl. No. 14/701,764, Non Final Office Action dated Jan. 27, 2017, 5 pgs.
(Continued)

*Primary Examiner* — Le H Luu
(74) *Attorney, Agent, or Firm* — Buckley, Maschoff & Talwalkar, LLC

(57) ABSTRACT

Disclosed are a system, a computer-readable storage medium storing at least one program, and a computer-implemented method of data transmission. A communication module interfaces communicatively with vehicles. A file management module selects first data from a data queue. The first data is addressed to a destination location. The file management module transmits the first data to the first vehicle. The file management module receives an acknowledgement message from a second vehicle interfaced with the communication interface module. The acknowledgement message is indicative of the first vehicle providing the first data to a server at the destination location. The file management module deletes the first data from the data queue.

20 Claims, 15 Drawing Sheets

(51) Int. Cl.
    *H04W 40/30*     (2009.01)
    *H04W 40/06*     (2009.01)
    *H04W 40/34*     (2009.01)
    *H04W 4/04*     (2009.01)
    *H04W 40/20*     (2009.01)

(52) U.S. Cl.
    CPC ........... *H04W 40/06* (2013.01); *H04W 40/20* (2013.01); *H04W 40/30* (2013.01); *H04W 40/34* (2013.01)

(58) Field of Classification Search
    CPC ..... H04W 40/046; H04N 7/183; H04L 67/12; H04L 45/34; H04L 45/123; H04L 45/00; H04L 43/062; H04L 12/5695; H04L 67/06; G06Q 10/0631; G06Q 10/047; G01C 21/3655
    See application file for complete search history.

(56) References Cited

U.S. PATENT DOCUMENTS

| | | | |
|---|---|---|---|
| 7,457,619 B2 | 11/2008 | Ariyur et al. | |
| 8,300,564 B2 | 10/2012 | Grimm et al. | |
| 9,756,116 B2 | 9/2017 | Ribeiro et al. | |
| 2001/0026549 A1* | 10/2001 | Hameleers | G06Q 10/047 370/389 |
| 2002/0169530 A1 | 11/2002 | Laguer-Diaz et al. | |
| 2008/0013559 A1* | 1/2008 | Smith | H04L 47/22 370/412 |
| 2009/0129316 A1* | 5/2009 | Ramanathan | H04L 45/123 370/328 |
| 2011/0149849 A1* | 6/2011 | Brownrig | H04L 45/00 370/328 |
| 2011/0215758 A1 | 9/2011 | Stahlin et al. | |
| 2012/0106350 A1* | 5/2012 | Yousefi | H04N 7/183 370/241 |
| 2013/0201316 A1* | 8/2013 | Binder | H04L 67/12 348/77 |
| 2013/0286846 A1* | 10/2013 | Atlas | H04L 45/34 370/236 |
| 2013/0322245 A1 | 12/2013 | Seo et al. | |
| 2014/0336919 A1* | 11/2014 | Li | G01C 21/3655 701/400 |
| 2015/0111591 A1* | 4/2015 | Hoffberg | G06Q 10/0631 455/452.1 |
| 2015/0264627 A1* | 9/2015 | Perdomo | H04W 40/12 370/329 |
| 2016/0197800 A1* | 7/2016 | Hui | H04L 43/062 370/252 |
| 2016/0323356 A1 | 11/2016 | Ribeiro et al. | |

OTHER PUBLICATIONS

U.S. Appl. No. 14/701,764, Notice of Allowance dated May 10, 2017, 7 pgs.

U.S. Appl. No. 14/701,764, Response filed Apr. 26, 2017 to Non Final Office Action dated Jan. 27, 2017, 8 pgs.

"Internet of Everything Kit by Etherios", [online]. (c) 1996-2015 Digi International Inc. [retrieved on Aug. 12, 2015]. Retrieved from the Internet: <URL: http://store.digi.com/index.cfm?fuseaction=Product.display&product_id=2880>, (2015), 1 pg.

"Keil MCBSTM32f200 Evaluation Board Overview", [online]. (c) 2013 ARM Ltd. [archived on Mar. 10, 2014]. Retrieved from the Internet: <URL: https://web.archive.org/web/20140310110918/http://www.keil.com/mcbsti32F200>, (2013), 2 pgs.

"Oracle Java ME Embedded Downloads", [online]. [retrieved on Aug. 12 2015]. Retrieved from the Internet: <URL: http://www.oracle.com/technetwork/java/embedded/downloads/javame/java-embedded-java-me-download-359231.html?>, (2015), 2 pgs.

Fall, Kevin, "A Delay-Tolerant Network Architecture for Challenged Internets", SIGCOMM 03, Aug. 25-29, 2003, Karlsruhe, Germany, (2003), 27-34.

Scott, K., "Bundle Protocol Specification", Network Working Group, Request for Comments: 5050, (Nov. 2007), 50 pgs.

Wood, Lloyd, "Assessing and improving an approach to delay-tolerant networking", First Annual CCSR Research Symposium (CRS 2011), (2011), 2 pgs.

* cited by examiner

DATA COMMUNICATION USING VEHICLE DATA CARRIERS

CLAIM OF PRIORITY

This application is a continuation of and claims the benefit of priority under 35 U.S.C. § 120 to U.S. patent application Ser. No. 14/701,764, which is incorporated by reference herein in its entirety.

TECHNICAL FIELD

Example embodiments of the present application generally relate to data communication and, more particularly in example embodiments, to a system and method for data communication using vehicles.

BACKGROUND

Communication systems provide various telecommunication services between geographically separated locations. For example, types of communication services can include telephony, video, data, messaging, and the like. Furthermore, wireless communication systems can be deployed to provide communication services on a municipal, national, regional, and even global level. For example, a station located in a remote part of the world can use satellite-based telecommunication systems and protocols to communicate with other stations located hundreds of miles away. For example, multiple remote stations, over time, may generate or collect data that is to be transmitted to a central processing station for analysis. The remote stations may be located in isolated areas of the world. Accordingly, these remote stations communicate the produced data to the central processing station using satellite-based communications.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various example embodiments discussed in the present document.

DETAILED DESCRIPTION

Overview

Figure 1:
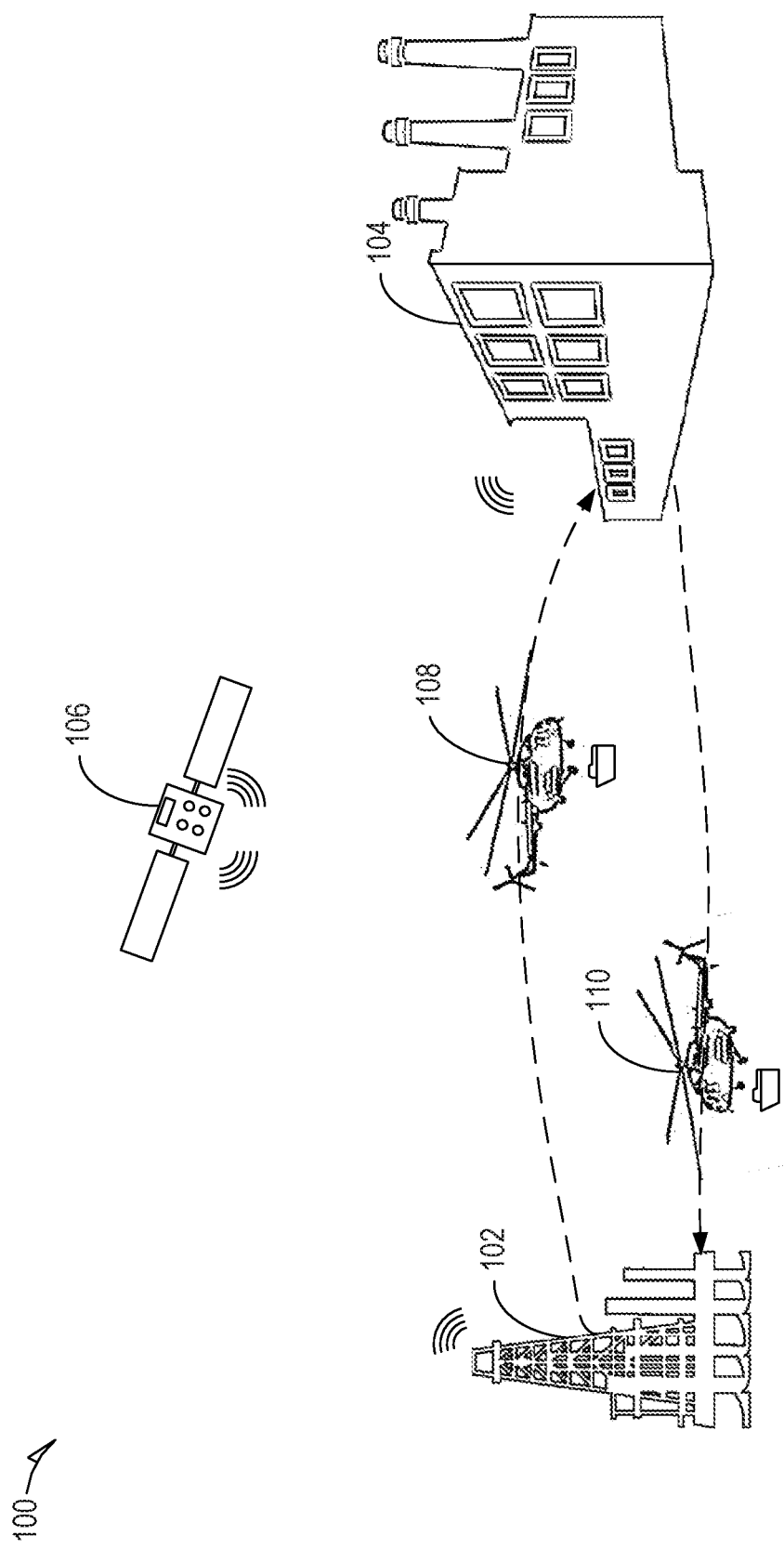
FIG. 1 is a system diagram depicting an environment, within which one example embodiment may be deployed.

The systems, methods, and devices described herein each have several aspects, no single one of which is solely responsible for its desirable attributes. Without limiting the scope of this disclosure, some features will now be discussed briefly merely by way of example.

In one example embodiment, a system is disclosed. The system comprises a communication module configured to interface communicatively with vehicles. The system further comprises a file management module, including one or more processors, configured to, in response to the communication module interfacing with a first vehicle for transmission of data, select first data from a data queue, the first data being addressed to a destination location. The file management module is further configured to transmit the first data to the first vehicle. The file management module is further configured to receive an acknowledgement message from a second vehicle interfaced with the communication interface module. The acknowledgement message is indicative of the first vehicle providing the first data to a server at the destination location. The file management module is further configured to, in response to receiving the acknowledgment message, delete the first data from the data queue.

In another example embodiment, a computer-implemented method of data transmission is disclosed. The computer-implemented method comprises interfacing communicatively with a first vehicle. The method further comprises, by one or more processors, selecting first data from a data queue. The first data is addressed to a destination location. The method further comprises transmitting the first data to the first vehicle. The method further comprises receiving an acknowledgement message from a second vehicle. The acknowledgement message is indicative of the first vehicle providing the first data to the destination location. The method further comprises, in response to receiving the acknowledgement message, deleting the first data from the data queue.

In another example embodiment, a machine-readable storage medium embodying instructions is disclosed. The instructions, when executed by a machine, cause the machine to perform operations comprising interfacing communicatively with a first vehicle. The operations further comprise selecting first data from a data queue. The first data is addressed to a destination location. The operations further comprise transmitting the first data to the first vehicle. The operations further comprise receiving an acknowledgement message from a second vehicle. The acknowledgement message is indicative of the first vehicle providing the first data to the destination location. The operations further comprise, in response to receiving the acknowledgement message, deleting the first data from the data queue.

Example Embodiments

Reference will now be made in detail to specific example embodiments for carrying out the inventive subject matter. Examples of these specific example embodiments are illustrated in the accompanying drawings. It will be understood that they are not intended to limit the scope of the claims to the described example embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Example embodiments may be practiced without some or all of these specific details.

In accordance with the present disclosure, components, process steps, and/or data structures may be implemented using various types of operating systems, programming languages, computing platforms, computer programs, and/or machines. In addition, those of ordinary skill in the art will recognize that other types of devices, such as hardwired devices, field programmable gate arrays (FPGAs), application specific integrated circuits (ASICs), or the like, may also be used without departing from the scope and spirit of the concepts disclosed herein. Example embodiments may also be tangibly embodied as a set of computer instructions stored on a computer readable medium, such as a memory device.

Example systems and methods, embodied on electronic devices, for data communication using vehicles as data carriers are described. In the following description, for purposes of explanation, numerous specific details are set forth in order to provide a thorough understanding of example embodiments. It will be evident, however, to one skilled in the art that example embodiments may be practiced without these specific details.

In example embodiments disclosed herein, a communication system facilitates transferring data from a source location to a destination location using vehicles to carry the data between the locations. For instance, the locations can be geographically distant and have limited or no access to the Internet, a computer network, a telephone network, or the like telecommunication networks interconnecting these locations communicatively. The locations can have fixed locations, such as corresponding to the location of a building structure. In alternative example embodiments, one or both of the locations can vary with time. For example, the source location can correspond to a vehicle (e.g., a land-based, air-based, water-based, subterranean-based, and/or space-based craft) with limited or no access to a conventional telecommunication system.

In operation, the locations can produce data (e.g., generated measurement data) that is to be sent back to land. In some cases, the transmission of the data to the destination location is not time critical. However, using a wireless communication channel can be costly or restricted. For example, where the only communication link between the source location and the destination location is a satellite-based link, the communication data may be expensive. Additionally or alternatively, the satellite-based link may have limited bandwidth for data communication. As such, the communication of non-essential data may be restricted.

In operation, vehicles (or any mobile devices) move between the locations with some frequency. For instance, vehicles can transport resources, people, and/or service to the locations, or otherwise travel near the locations. As will be described later in greater detail, the source location transfers data to the destination location by transferring the data to a visiting or nearby vehicle (called a temporary data storage (TDS) vehicle), and then the TDS vehicle transfers the data to the destination location when the TDS vehicle arrives at (or is within communication distance of) the destination location. As such, example embodiments disclosed herein can allow for low-cost bidirectional transmission of delay-tolerant data, for instance, in environments with limited access to conventional telecommunication services.

Example embodiments will be described in the context one or more of the locations having limited or no access to conventional telecommunication systems. It will be appreciated, however, that example embodiments can be deployed by locations that have adequate/abundant access to conventional telecommunication networks. In such cases, the example vehicle-based communication systems described herein can provide an alternative method of transferring data that can reduce cost, increase efficiency, and/or increase reliability. For example, transferring data using a satellite-based communication system can be expensive, and using an example vehicle-based communication systems described herein can reduce communication costs.

As further illustration, FIG. 1 is a system diagram depicting an environment 100, within which one example embodiment is deployed. While FIG. 1 depicts a particular illustrative example, a general environment will be described later in connection with FIG. 2. For instance, in the illustrated example embodiment of FIG. 1, an offshore oil rig 102 has data to transmit to an on-shore facility 104, which can be located at a distance from the off-shore oil rig 102. Additionally or alternatively, the on-shore facility 104 can have data to send to the offshore oil rig 102. The offshore oil rig 102 can establish a communication link with a satellite communication system 106 to transmit the data to the on-shore facility 104. However, communication using the satellite communication system 106 can be expensive, limited, and/or unreliable. Accordingly, the offshore oil rig 102 can transfer the data to a vehicle, such as a helicopter 108, that has traveled to or near the off-shore oil rig 102 and that will travel to or near the on-shore facility 104. Likewise, a helicopter 110 can carry data from the on-shore facility 104 to the offshore oil rig 102.

Accordingly, communication between the source location (e.g., the offshore oil rig 102) and the destination location (the onshore facility 104) includes three moments: (i) data exchange between the source location and TDS vehicle; (ii) data movement while TDS vehicle moves; and (iii) data exchange between TDS vehicle and destination location. Furthermore, with respect to the messaging between the source location and destination location and between each of the locations and the TDS vehicle, there are two protocols: (i) a so-called "punctual" protocol that defines how the source and destination locations exchange information with the TDS vehicle; and (ii) a so-called end-to-end protocol, conceptually being at a higher level of abstraction than the punctual protocol, that defines how the source location exchanges information with the destination location via the TDS vehicle.

As will be described in greater detail later in connection with FIG. 2, there can be multiple source locations and multiple destination locations. Furthermore, a particular location can be a both a source location and a destination location, and vary being a source location, a destination location, or both over time. Regarding the communication infrastructure, these locations can be isolated (e.g., in terms of conventional telecommunication systems' from each other or they can be interconnected via other communication links. Additionally or alternatively, there may be multiple vehicles serving as data carriers, increasing the total equivalent bandwidth.

Figure 2:
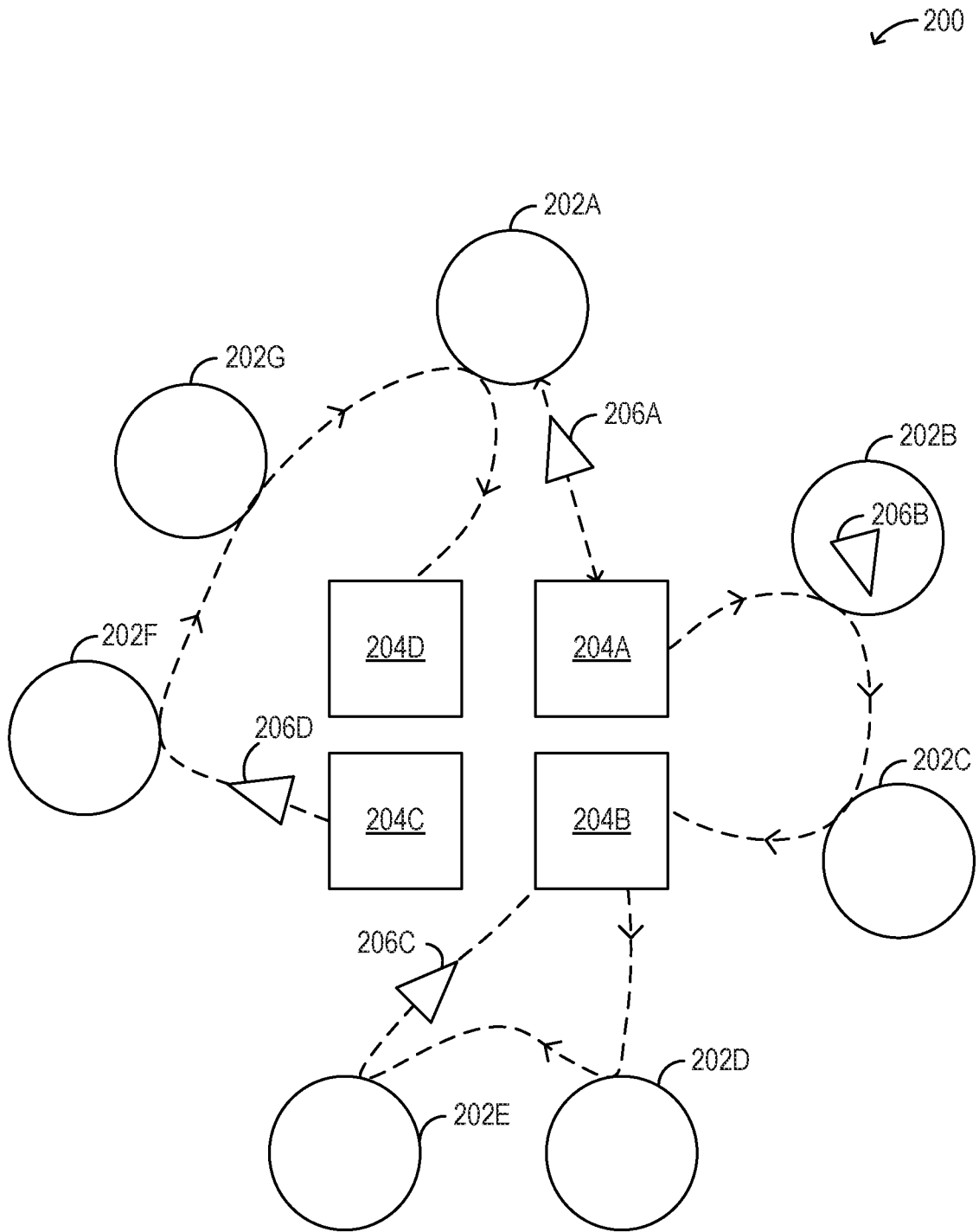
FIG. 2 is a block diagram illustrating a communication system, according to an example embodiment, including multiple locations and vehicles.

FIG. 2 is a block diagram illustrating a communication system 200, according to an example embodiment, including multiple locations and vehicles. The communication system 200 includes a number of locations 202A-G, a number of locations 204A-D, and a number of vehicles 206A-D. In particular, the locations 202A-G correspond to regular locations and the locations 204A-D correspond to master locations. The master location centralize important activities, such as, but not limited to, the registration of new vehicles and regular locations, the generation of public/private key pairs, and managing information, such as, but not limited to, vehicle routing data. A regular location is a location that is not a master location. While a location's data source or data destination roles can vary over time, in some example embodiments, the master and regular location roles are fixed. The communication system 200 can include one master location or multiple master locations. In the case of multiple master locations, the master locations can communicate with each other using wired or wireless communications and without using the vehicles 206A-D (e.g., by using conventional communication systems). A location can be chosen to be a master location based on frequency of visits by the vehicles 206A-D, the number of the vehicles 206A-D visiting the location, and/or the like.

In operation, the vehicles 206A-D travel from one master location 204A-D to a number of regular locations 202A-G before returning to a master location 204A-D (e.g., either the same master location or a different master location). As the vehicles 206A-D travel between the locations 202A-G, 204A-D, the vehicles 206A-D transfer data between the locations that are along the route of the respective vehicles 206A-D. In an example embodiment, the communication system 200 can include the environment 100. For instance, the offshore rig 102 can correspond to a regular location and the onshore facility 104 can correspond to a master location. The locations 202A-G, 204A-D, and vehicles 206A-D will be described in greater detail.

Figure 3:
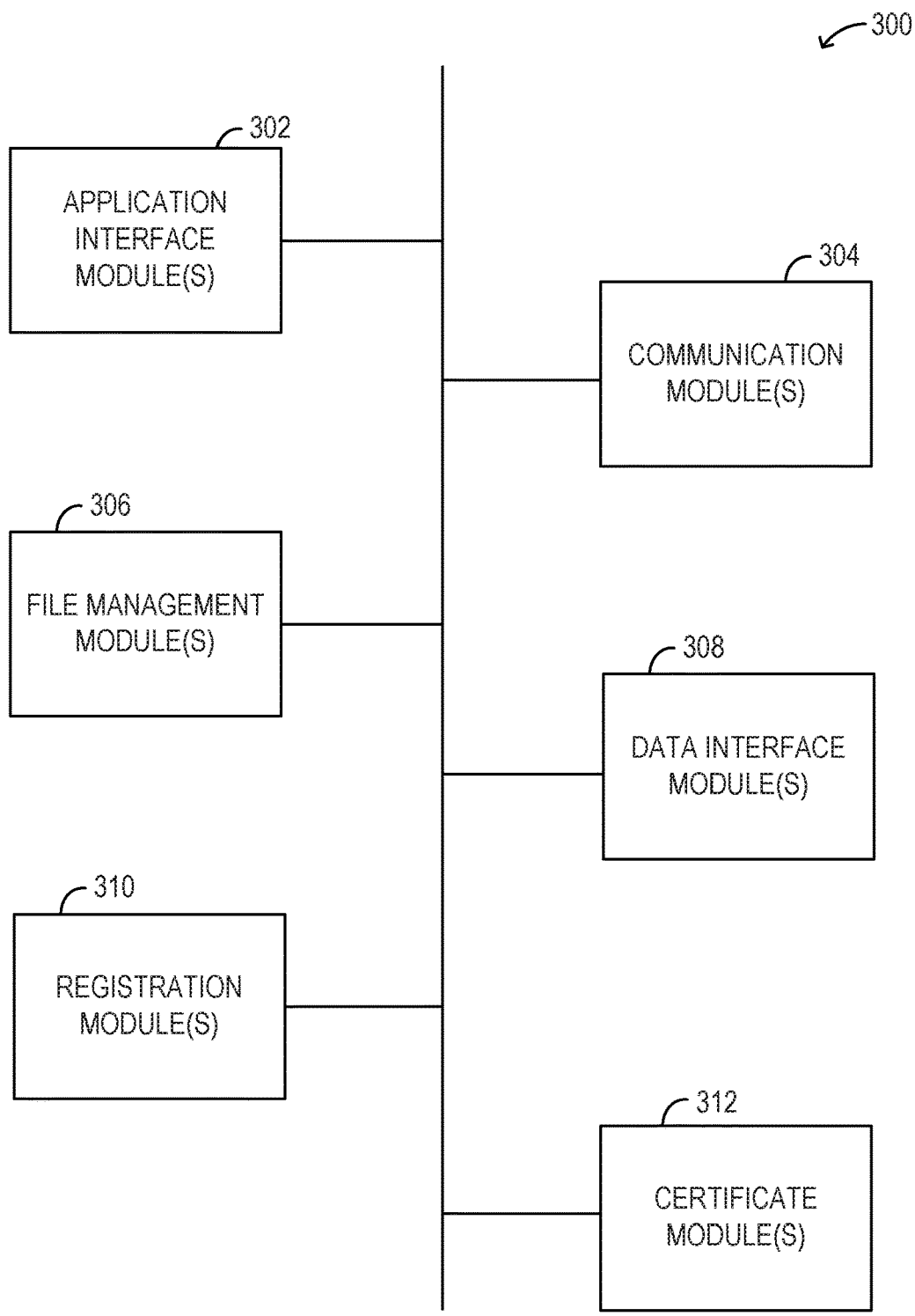
FIG. 3 is a block diagram depicting an example embodiment of a location server including multiple modules forming at least a portion of the communication system of FIG. 2.

FIG. 3 is a block diagram depicting an example embodiment of a location server 300 including multiple modules forming at least a portion of the communication system 200 of FIG. 2. The location server 300 can be deployed by one or more of the locations 202A-G, 204A-D. The modules 302-312 of the illustrated location server 300 include an application interface module(s) 302, a communication module(s) 304, a file management module(s) 306, a data interface module(s) 308, a registration module(s) 310, and a certificate module(s) 312. It will be appreciated that alternative example embodiments can include fewer or additional modules. For instance, a regular location (e.g., one of the regular locations 202A-G) can omit the registration module(s) 310 and certificate module(s) 312 in an example embodiment. Moreover, it will be appreciated that in alternative example embodiments, one or more modules of the location server 300 described below can be included, additionally or alternatively, in components of FIG. 2 other than the one or more the locations 202A-G, 204A-D.

The modules 302-312 of the location server 300 can be hosted on dedicated or shared server machines (not shown) that are communicatively coupled to enable communications between server machines. Each of the modules 302-312 are communicatively coupled (e.g., via appropriate interfaces) to each other and to various data sources, so as to allow information to be passed between the modules 302-312 of the location server 300 or so as to allow the modules 302-312 to share and access common data.

The location server 300 can be deployed by computer connected to a communication network which the vehicle will have access when it arrives at the location. The location server 300 can run, for instance, file transfer server software (e.g., File Transfer Protocol (FTP), Secure FTP (SFTP), FTP Secure (FTPS), User Datagram Protocol-based Data Transfer Protocol (UDT), and/or the like), with read and/or write permissions for moving data from and/or to a TDS vehicle (e.g., vehicles 206A-D).

The application interface module(s) 302 is a hardware-implemented module configured to interface with software programs (e.g., an operating system and/or external applications) executed on the location server. For example, the application interface module(s) 302 can receive a request message as a request to transmit the data from the location server 300 to another location server. The request message can be received from a software program (e.g., an application or an operating system) executed on the location server 300. In an example embodiment, the request message includes data (e.g., at least a portion of a file) and address data (e.g., data usable to identify and/or address one of the locations 202A-G, 204A-D) as a request to transmit the data from the location server 300 to another location server identified by the address data. Furthermore, the application interface module(s) 302 can receive request messages from software programs that request that request data that has been received by the location server 300. Other types of messages received by the application interface module(s) 302 will be described in greater detail below.

The communication module(s) 304 is a hardware-implemented module that is configured to communicatively interface with a TDS vehicle (e.g., as will be described in FIG. 4). For instance, the communication module(s) 304 can create a communication link with the TDS vehicle using a suitable protocol, such as FTP, SFTP, FTPS, UDT, and/or the like. Over a communication link, the location server 300 and the TDS vehicle can communicate a number of types of messages and data, as described below.

In an example embodiment, the communication module(s) 304 facilitates communicating data (e.g., in the form of files) with a TDS vehicle, as well communicating acknowledgements with a TDS vehicle. The communication can be based on multiple wireless or wired standards. The communication module(s) 304 can communicate at a data rate selected based on available transmission speeds (or bandwidth, in bits per second), maintaining the compatibility with the standards of the networks where the data source and data destination are contained.

The file management module(s) 306 is a hardware-implemented module configured to maintain a number of data structures facilitating data transfer between locations and between the location server 300 and a TDS vehicle. The data structures will be described in greater detail in connection with FIG. 5.

The data interface module(s) 308 is a hardware-implemented module that includes, or interfaces with, one or more data storage devices. The data interface module(s) 308 serves to provide non-volatile memory to store data that is to be transmitted to another location server or has been received from another location server. For instance, as non-limiting examples, memory can be provided by a hard drive, a solid-state drive, and/or a flash drive. The capacity of the memory can be selected to be proportional to the amount of data to be transmitted from location server 300 to other location servers, e.g., considering the frequency of arrival of the TDS vehicles and the time the TDS vehicles spend at the locations.

The registration module(s) 310 is a hardware-implemented module configured to perform registration of new entities (e.g., location servers and/or TDS vehicles). The certificate module(s) 312 is a hardware-implemented module configured to manage certificates and distribution of public and private keys for authenticating entities, as described below.

Figure 4:
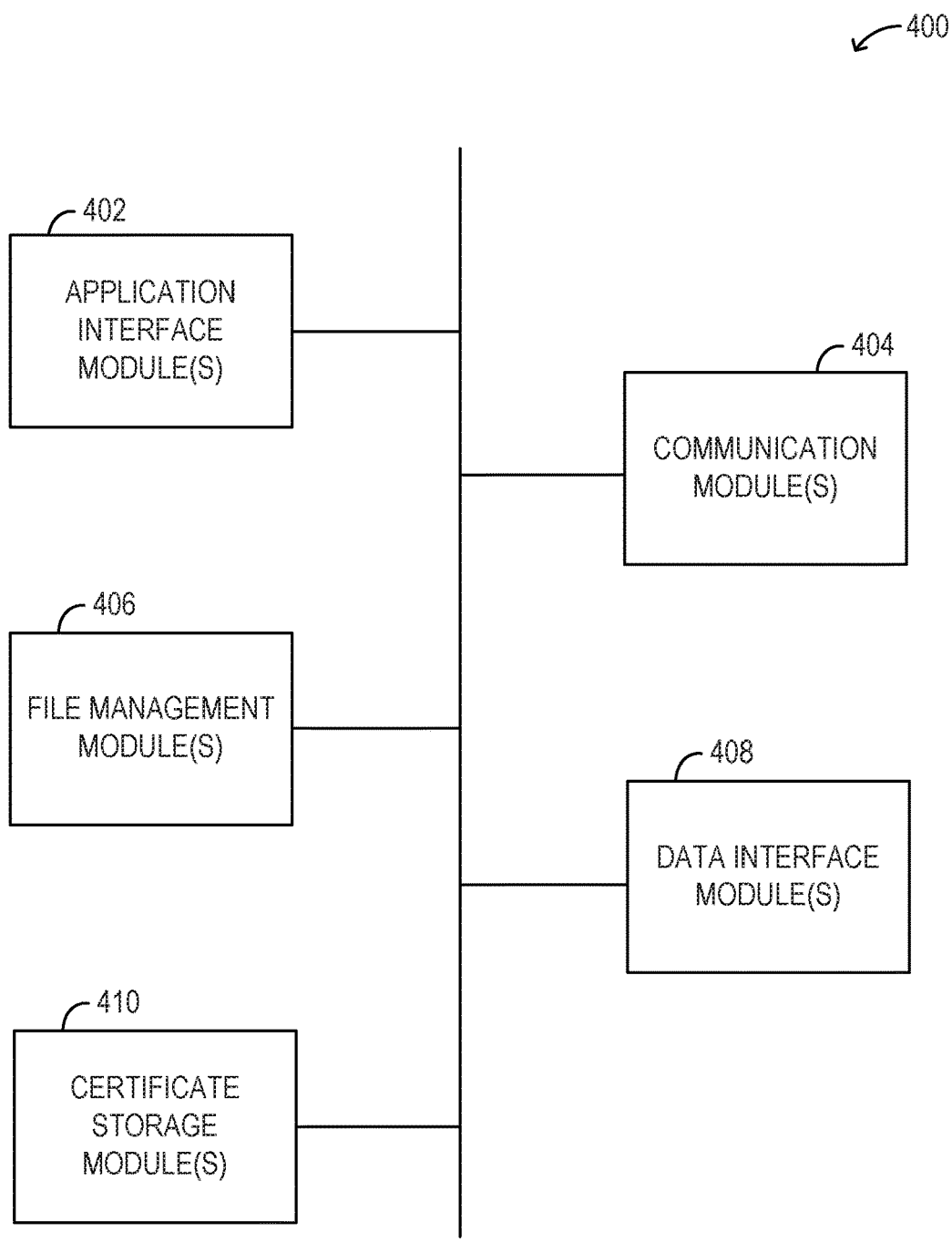
FIG. 4 is a block diagram depicting an example embodiment of a vehicle unit including multiple modules forming at least a portion of the communication system of FIG. 2.

FIG. 4 is a block diagram depicting an example embodiment of a vehicle unit 400 including multiple modules 402-410 forming at least a portion of the communication system 200 of FIG. 2. The vehicle unit 400 can be deployed on one or more of the vehicles 206A-D of FIG. 2. The modules 402-410 of the illustrated vehicle unit 400 include an application interface module(s) 402, a communication interface module(s) 404, a file management module(s) 406, a data interface module(s) 408, and a certificate storage module(s) 410. It will be appreciated that alternative example embodiments may include fewer or additional modules.

In an example embodiment, the vehicle unit 400 is resistant to the typical environment that is encountered by a TDS vehicle deploying the vehicle unit 400. For example, the physical assembly of the vehicle unit 400 can include components that provide vibration, shock, temperature, water, and dust resistance.

The application interface module(s) 402 is a hardware-implemented module configured to interface with software programs (e.g., an operating system and/or software applications) executed on the TDS vehicle. For example, the application interface module(s) 402 can communicate request messages and data with software programs, as will be described in greater detail below.

The communication module(s) 404 is a hardware-implemented module that is configured to communicatively interface with a location server 300. For instance, the communication module(s) 404 can create a communication link with the communication module(s) 304 of the location server 300 using a suitable protocol, such as FTP, SFTP, FTPS, UDT, and/or the like. Over a communication link, the vehicle unit 400 and the location server 300 can communicate a number of types of messages and data, as described below.

In an example embodiment, the communication module(s) 404 facilitates communicating data and acknowledgements with the location server 300. The communication can be based on a number of wireless or wired standards. The communication module(s) 404 can communicate at a data rate selected based on available transmission speeds (or bandwidth, in bits per second), maintaining the compatibility with the standards of the networks where the data source and data destination are contained.

The file management module(s) 406 is a hardware-implemented module configured to maintain data structures facilitating data transfer between locations. The data structures will be described in greater detail in connection with FIG. 6.

The data interface module(s) 408 is a hardware-implemented module that includes, or interfaces, with one or more data storage devices. The data interface module(s) 408 serves to provide non-volatile memory to store data that is to be transmitted to between location servers 300. For instance, as non-limiting examples, memory can be provided by a hard drive, a solid-state drive, and/or a flash drive. The capacity of the memory can be selected to be proportional to the amount of data to be transmitted from location server 300 to other location servers, e.g., considering the frequency of arrival of the TDS vehicles and the time the TDS vehicles spend at the locations.

The certificate storage module(s) 410 is a hardware-implemented module configured to store and manage private keys, public keys, and certificates for authenticating the vehicle unit 400 with a location server 300, as described below.

In an aspect of an example embodiment, the communication system 200 transmits data reliably and securely from one location to another through the use of mobile entities. To this end, data structures, algorithms and protocols that can be divided in two groups: an end-to-end data transmission scheme and a punctual data transmission scheme.

In connection with end-to-end data transmission, embodiments described herein control the transmission of data from the source location to the destination location. For instance, data (e.g., files or portions of files) and acknowledgement messages (ACK messages) are transferred from one location to others, acknowledged files are deleted, and the current state of the produced files are tracked. An ACK message can include a file identifier, a file-portion identifier, and a destination-location identifier. The file identifier can be usable to identify the data file to which the ACK message corresponds. The file-portion identifier can be usable to identify the portion or piece of the data file to which the ACK message corresponds. For instance, a data file can be transmitted in multiple pieces. A destination-location identifier can be usable to identify the destination location of the data file to which the ACK message corresponds.

In operation, the data is sent from a source location to a destination location; second, ACK messages are sent from the destination location back to the source location. Furthermore, after transmitting its data, the source location waits for some time (e.g., in accordance with a time-out value) to receive an ACK message that indicates that the data was received by the destination location. In case that time-out value elapses, the source location retransmits the corresponding non-acknowledged data. The time-out value can be chosen depending on the scenario. The selection of the time-out value can be directly correlated with the time that a TDS vehicle takes to return to the same location again on average. End-to-end data transmission will be described in greater detail later in connection with FIGS. 5-8, and 17.

In connection with punctual data transmission scheme, embodiments described herein control the transmission of data when a TDS vehicle approaches a location. For instance, there is the exchange of data, ACK messages, and routing data between these entities, as well as authentication data. In example embodiments, the transmitted data is encrypted. Punctual data transmission will be described in greater detail later in connection with FIGS. 9-16.

Figure 5:
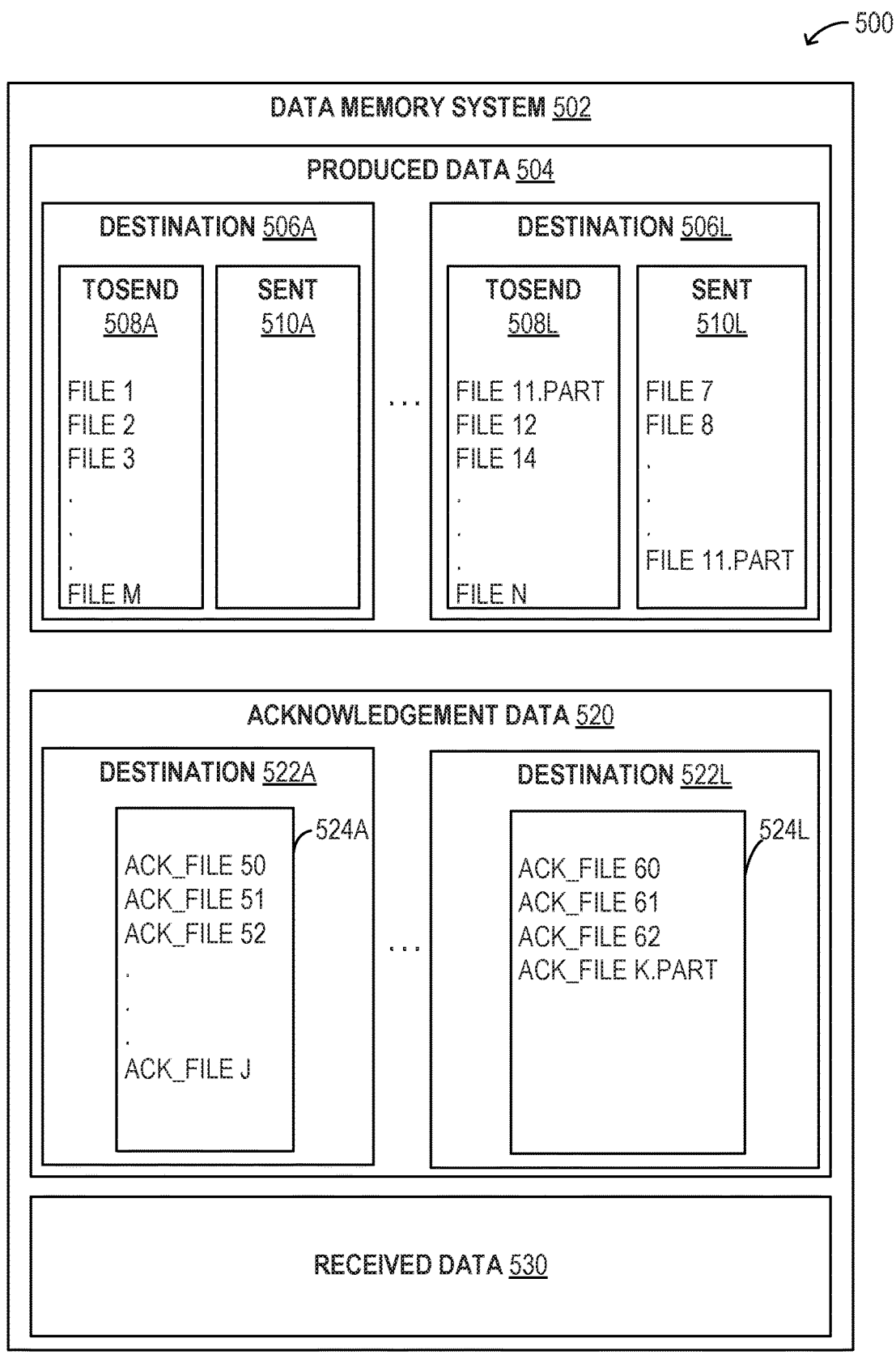
FIG. 5 is a block diagram illustrating data structures, according to an example embodiment, of the location server of FIG. 3.

FIG. 5 is a block diagram illustrating data structures 500, according to an example embodiment, by the location server 300 of FIG. 3. In an example embodiment, the data interface module(s) 308 is configured to access the data structures 500 from a data storage device. Furthermore, the file management module(s) 306 maintains the data structures 500. In operation, the data structures 500 facilitate end-to-end data transmission schemes.

As shown, the data memory system 502 includes produced data 504 that, in turn, includes one or more destination data structures 506A, ..., 506L. The reference L represents the number of destination locations with reference to the location server 300. The number L can be any suitable number. The destination data structure 506A includes data fields TOSEND 508A and SENT 510A. Each of the destination data structures 506A, ..., 506L is associated with a destination location. As such, the data field TOSEND 508A includes data files (e.g., FILE 1, ..., FILE M), or references to data files, that are to be sent to a first destination location that is associated with destination data structure 506A. The data field SENT 510A includes data files, or references to data files, that have been sent to the first destination location. When the location server 300 receives an ACK message that indicates that a file in the data field SENT 510A was received by the first destination location, the location server 300 removes the file from the data field SENT 510A. For example, in the illustrated embodiment of FIG. 5, the data field SENT 510A is depicted as being empty, which indicates that there are no files that have been sent by the location server 300 to the first destination location and for which the location server 300 has not received a corresponding ACK message from the first destination location.

Likewise, the destination data structure 506L includes data fields TOSEND 508L and SENT 510L. The destination data structure 506L is associated with an L-th destination location. As such, the data field TOSEND 508L includes data files or references to data files (e.g., FILES 11-N) that are to be sent to the L-th destination. The SENT 510L includes data files or references to data files (e.g., FILES 7-11) that have been sent to the destination location. When the location server 300 receives an ACK message that indicates that a file in the data field SENT 510L was received by the L-th destination location, the location server 300 removes the file from the data field SENT 510L. Accordingly, in the illustrated embodiment of FIG. 5, the data field SENT 510L is depicted as including FILES 7-11, which indicates that these files have been sent by the location server 300 and for which there has been no ACK message received.

Furthermore, based on the available storage space of a visiting TDS vehicle, the location server 300 can transmit a portion of a file within the destination data structures 506A, ..., 506L. For example, FILE 11 stored in the data fields TOSEND 508L and SENT 510L is marked with a "PART" indicator to indicate that FILE 11 has been partially sent. Transmission of partial files will be described later in greater detail.

Additionally or alternatively, the data memory system 502 includes acknowledgment data 520 that facilitates the location server 300 to transmit ACK messages in response to receiving data from source locations. For example, the acknowledgment data 520 includes one or more data structures DESTINATION 522A, ..., 522L. In operation, the data structures DESTINATION 522A, ..., 522L are each linked to a destination location of ACK messages. As stated, the destination location of an ACK message corresponds to a source location of a data file received at the location server 300.

Accordingly, the data structure DESTINATION 522A includes a data field TOSEND 524A. For example, the data field TOSEND 524A includes ACK messages ACK_FILE 50, ACK_FILE J that are designated to be sent to the destination location associated with the data structure DESTINATION 522A. Each of the ACK messages ACK_FILE 50, ..., ACK_FILE J can correspond to an ACK message to be sent in response to receiving a data file from the destination location. Similarly, the destination data structure 522L includes a TOSEND 524L.

In example embodiments, the data memory system 502 includes received data 530. The received data includes data files that the location server has received from a TDS vehicle. Through the application interface module(s) 302, software programs can access the received data 530. In the case of partial-file transmission, the file management module(s) 306 stores pieces of a file in the received data 520 in a queue as the pieces are delivered at the location server 300. Once the all the pieces of the complete file have been delivered, the file management module(s) 306 assembles the complete file and allows it to be accessed.

In operation, the location server 300 controls the transmission of its produced files by classifying the produced files according to their destination and their state (e.g., a to-send state or a sent state). The structure used to perform this classification can be implemented in a number of ways. For example, the location server 300 can use distinct directories, a list, or other appropriate data structures. In the example embodiment of FIG. 5, the location server 300 classifies the produced files based on destinations (e.g., destination data structures 506A, ..., 506L). Moreover, the produced files within each destination data structure 506A, ..., 506L is further classified based on whether the file is in the to-send state (e.g., the data field TOSEND 508A in connection with destination data structure 506A) or in the sent state (e.g., the data field SENT 510A in connection with destination data structure 506A).

In operation, the location server 300 transmits the files stored in the to-send state to a TDS vehicle (e.g., via a vehicle unit 400) if the route of the TDS vehicle includes the destination of the files. The location server 300 removes files in the sent state from the data field SENT 510A, ..., 510L when corresponding ACK messages are received. Additionally or alternatively, the location server 300 moves files in the data field SENT 510A, ..., 510L to the data field TOSEND 508A, ..., 508L otherwise (e.g., after a time-out value elapses without receiving a corresponding ACK message).

In operation, the location server 300 controls the ACK messages it sends to source locations. The location server 300 organizes the ACK messages according to the destinations of the ACK messages. Again, the structure used to perform this classification can be implementation dependent. For instance, the location server 300 can use distinct directories, lists, and/or other appropriate combinations of data structures. In the example embodiment of FIG. 5, the location server 300 classify its ACK messages based on the destination of the ACK messages (e.g., in other words, the source location of the received data). For instance, when a file is received, a corresponding ACK message is created and the source location of the file is set as the destination of the ACK message. The location server 300 sends the ACK messages to a TDS vehicle for delivery to the destination of the ACK message if the route of TDS vehicle includes the destination of the ACK message. In response to transferring an ACK message to a TDS vehicle, the location server 300 removes the ACK from the corresponding data field 524A, . . . , 524L.

In operation, the location server 300 organizes produced data based on priority. In an example embodiment, the location server 300 lists the files in descending order of importance so that the high-priority files are transmitted first when a TDS vehicle becomes available. The TDS vehicle (e.g., via vehicle unit 400) keeps the order while they carry the files from the source location to the destination location.

The criteria used for classifying the importance of a file can be based on implementation specifics. For example, non-limiting example factors influencing priority can include one or more of freshness of the files, file size, context of the data, and the like.

If the location server 300, which can correspond to either a master or regular location, is both a source location and a destination location, the location server 300 can maintain both the produced data 504 and the acknowledgment data 520. If the location server 300 is a source location and not a destination location, the location server 300 can omit the acknowledgment data 520. If the location server 300 is not a source location and is a destination location, the location server 300 can omit the produced data.

Figure 6:
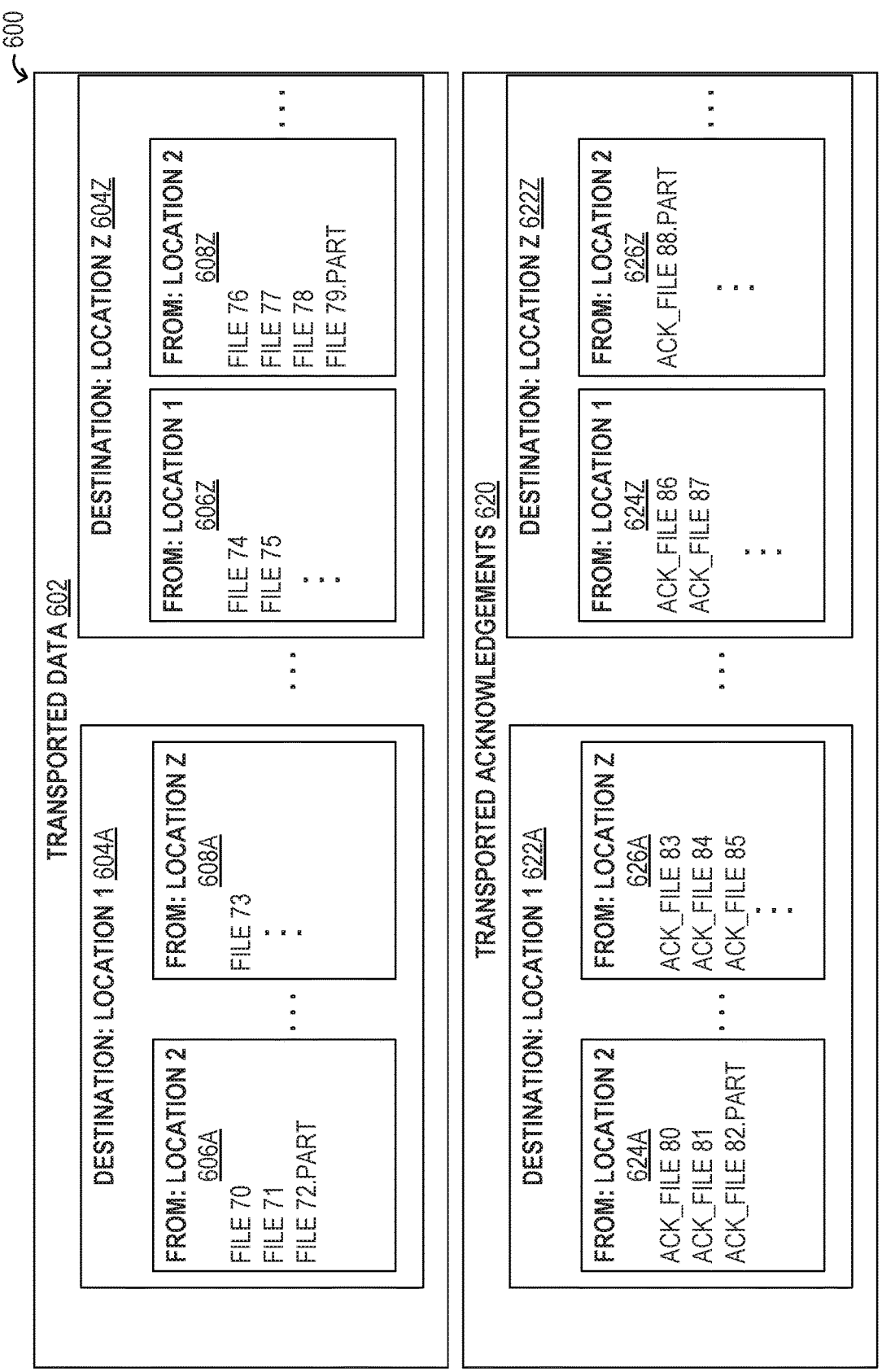
FIG. 6 is a block diagram illustrating data structures, according to an example embodiment, of the vehicle unit of FIG. 4.

FIG. 6 is a block diagram illustrating data structures 600, according to an example embodiment, used by the vehicle unit 400 of FIG. 4. In an example embodiment, the data interface module(s) 408 is configured to access the data structures 600 from a data storage device. Furthermore, the file management module(s) 406 maintains the data structures 600 during operation. In one aspect, the data structures 600 facilitate the vehicle unit's 400 performance within end-to-end data transmission schemes.

In operation, a vehicle unit 400 of a TDS vehicle carries data (files) from the source location to the destination location and carries ACK messages in the opposite direction. A vehicle unit 400 of a TDS vehicle can carry data and ACK messages from multiple source locations to multiple destination locations. The vehicle unit 400 organizes the data structure 600 in different groups divided by source and destination locations.

As shown, the data structures 600 includes transported data 602 that, in turn, include one or more destination data structures 604A, . . . , 604Z. The letter Z represents the number of destination locations of the data stored and transported by the vehicle unit 400. The number Z can be any suitable number. The destination data structures 604A, . . . , 604Z organize files, or references to the files, by destination locations. Furthermore, the files within each of the destination data structures 604A, . . . , 604Z are organized by source location. For instance, the destination data structure 604A includes files to be transported to a first location (e.g., DESTINATION: LOCATION 1). The files of the destination data structure 604A are organized by the data fields 606A, . . . , 608A. The data field 606A includes files (e.g., FILE 70, . . . , FILE 72.PART) that were received from a second location (e.g., FROM: LOCATION 2), and the data field 608A includes files (e.g., FILE 73 and so forth) that were received from a Z-th location (e.g., FROM: LOCATION Z). Likewise, the destination data structure 604Z includes files to be transported to the Z-th location (e.g., DESTINATION: LOCATION Z). The files of the destination data structure 604Z are organized by the data fields 606Z, 608Z, and so forth. The data field 606Z includes the files (e.g., FILE 74, FILE 75, and so forth) that were received from the first location (e.g., FROM: LOCATION 1), and the data field 608Z includes the files (e.g., FILE 76-79.PART) that were received from the second location (e.g., FROM: LOCATION 2).

Additionally or alternatively, the data structures 600 includes transported acknowledgments 620 that, in turn, include one or more destination data structures 622A, . . . , 622Z assigned to the Z locations. Accordingly, the destination data structures 622A, . . . , 622Z organize ACK messages by destination locations. Furthermore, the ACK messages stored within each of the destination data structures 622A, . . . , 622Z are organized by source location. For instance, the destination data structure 622A includes ACK messages to be transported to a first location (e.g., DESTINATION: LOCATION 1). The ACK messages of the destination data structure 622A are organized into the data fields 624A, . . . , 626A. The data field 624A includes ACK messages (e.g., ACK_FILE 80, . . . , ACK_FILE 82.PART) that were received from the second location (e.g., FROM: LOCATION 2), and the data field 626A includes ACK messages (e.g., ACK_FILE 83, . . . , ACK_FILE 85, and so forth) that were received from the Z-th location (e.g., FROM: LOCATION Z). Likewise, the destination data structure 622Z includes ACK messages to be transported to the Z-th location (e.g., DESTINATION: LOCATION Z). The ACK messages of the destination data structure 622Z are organized by the data fields 624Z, 626Z, and so forth. The data field 624Z includes ACK messages (e.g., ACK_FILE 86, ACK_FILE 87, and so forth) that were received from the first location (e.g., FROM: LOCATION 1), and the data field 626Z includes ACK messages (e.g., ACK_FILE 88.PART and so forth) that were received from the second location (e.g., FROM: LOCATION 2).

In operation, the files and ACK messages transported by the vehicle unit 400 of the TDS vehicle can be removed from the data structures in response to the vehicle unit 400 delivering data at their destinations. In an example embodiment, the vehicle unit 400 transmits data (e.g., files and/or ACK messages) from the TDS vehicle to the location prior to receiving and storing data and ACK messages from the location. In this way, the vehicle unit 400, having limited memory capacity, can increase the amount of new data that the vehicle unit 400 can receive and can store at a new location by offloading data before writing new data to the memory of the TDS vehicle.

Figure 7:
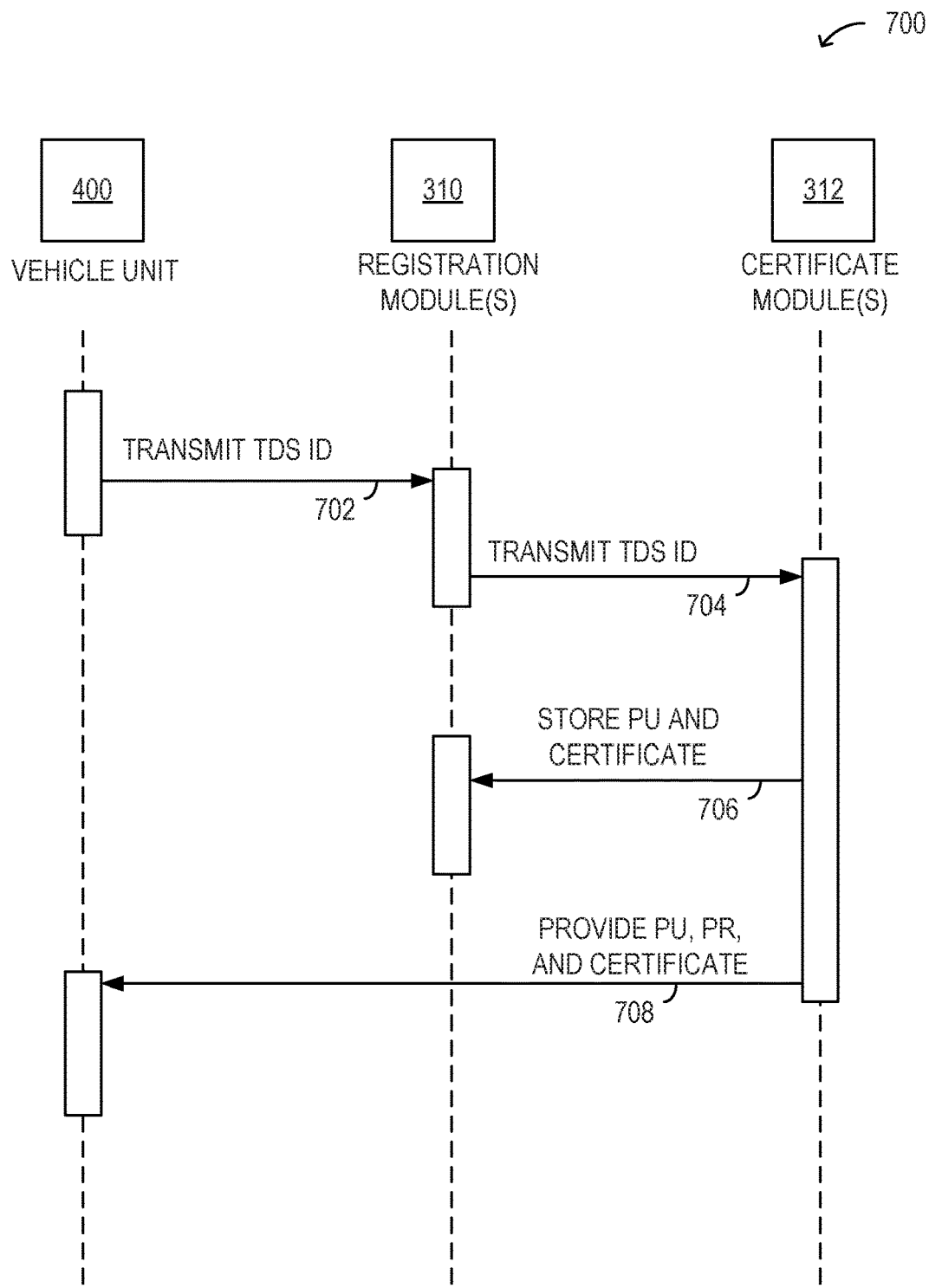
FIG. 7 is an interaction diagram illustrating a method, in accordance with an example embodiment, of registering an entity with the communication system of FIG. 2.

FIG. 7 is an interaction diagram illustrating a method 700, in accordance with an example embodiment, of registering an entity with the communication system 200 of FIG. 2. The registering entity can correspond to any suitable device, such as but not limited to a TDS vehicle or a regular location, that is capable of communicating data with a master location within the communication system 200. The illustrated example embodiment of FIG. 7 illustrates interactions between the vehicle unit 400, the registration module(s) 310, and the certificate in module(s) 312 of FIGS. 3 and 4. It will be appreciated, however, that the sequence described below can be substantially the same in case of the entity being a regular location, with the registering regular location taking the place of the registering vehicle unit 400.

An example embodiment, the communication system 200 includes at least a master location. As stated, the master location is configured to manage the registration of entities within the system 200 by issuing certificates to these new entities that join the system and by managing their public/private key pairs.

Accordingly, the example embodiment the vehicle unit 400 transmits a TDS identifier to the registration module 310 of the location server 300 at operation 702. For example, the communication module 404 of the vehicle unit 400 can establish a communication link with the communication module 304 of the location server 300. Over the established communication link, the vehicle unit 400 can provide the location server 300 a registration request that includes a TDS identifier (e.g., a unique identifier) for the vehicle unit 400. An example embodiment, the vehicle unit 400 can generate the TDS identifier by using a pseudorandom number generator. It will be appreciated that the TDS identifier can be any suitable identifier that can be used to identify the TDS vehicle (vehicle unit 400).

At operation 704, the registration module 310 of the location server 300 provides the received TDS identifier to the certificate module 312 for generating authentication data. Authentication data includes a public key (PU), a private key (PR), and security certificates for authenticating the new entity with TDS vehicles and/or locations within the communication system 200.

In response to receiving the TDS identifier, the certificate module(s) 312 generates the authentication data. The private key is to be kept private between the certificate modules(s) 312 and the vehicle unit 400. The public key is to be stored at the certificate module(s) 312 and it is to be provided in the form of a signed certificate to the other registered entities within the communication system 200. In an example embodiment, a certificate comprises a public key and its proprietor identification that is signed by a misted third party (e.g., the certificate module(s) 312). The certificates of the entities within the communication system 200 are stored at a master location. Each entity should have a copy of its certificate to exchange with other entities when it wants to perform authentication.

At operation 706, the certificate module(s) 312 stores the generated PU and the certificate with the registration module 310. Furthermore, at operation 708, the certificate module 312 provides the vehicle unit 400 the generated PU, PR, and the certificate. In response to receiving the PU, the PR, and the certificate data, the vehicle unit 400 stores the received data in a data storage device using the memory interface module 408.

Figure 8:
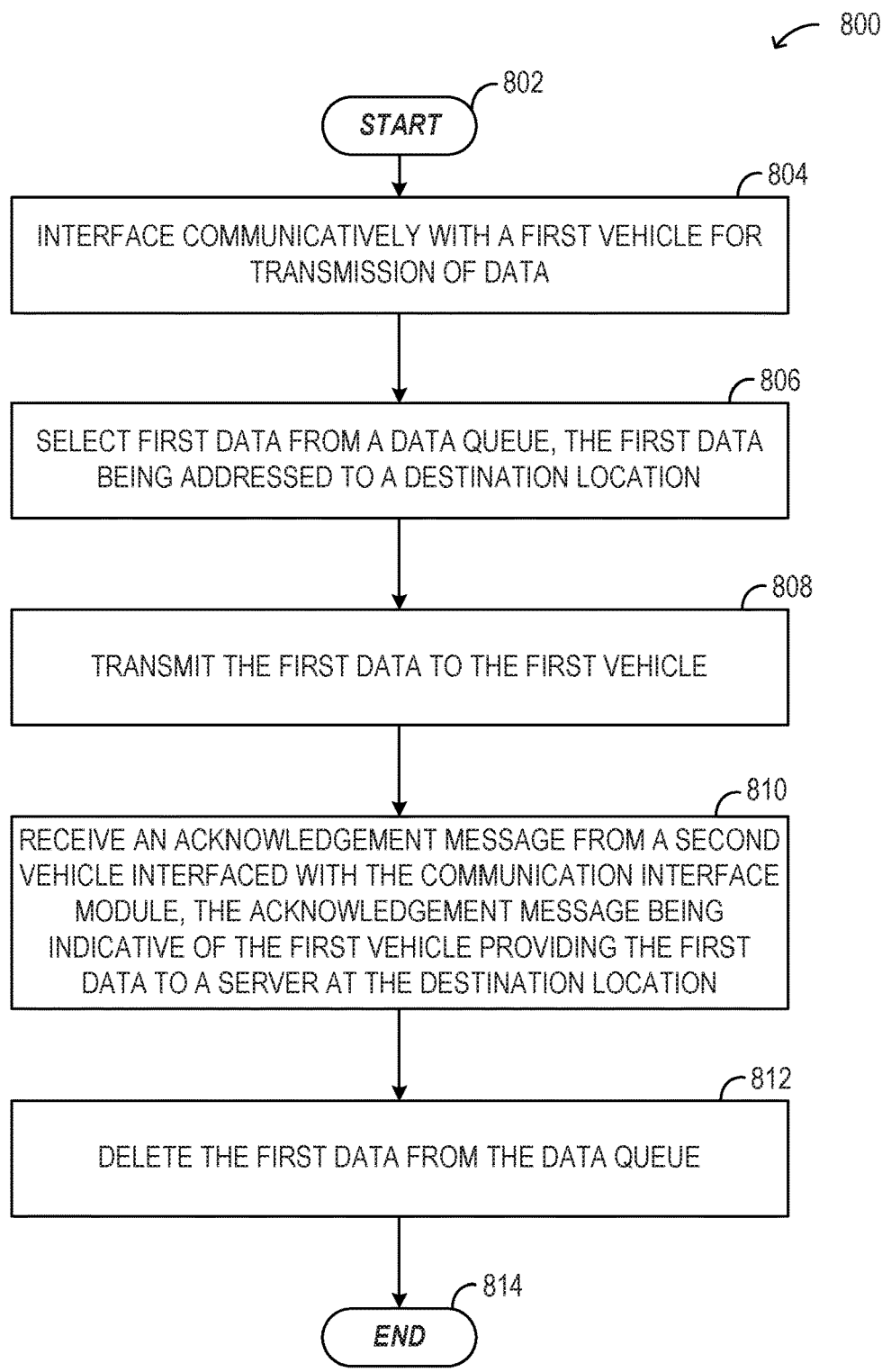
FIG. 8 is a flowchart illustrating a method, in accordance with an example embodiment, of communicating data using a vehicle to deliver the data.

FIG. 8 is a flowchart illustrating a method 800, in accordance with an example embodiment, of communicating data using a vehicle to deliver the data. The method 800 can be embodied by the location server 300 of either a master location 204A-D or a regular location 202A-G within the communication system 200. In this example, the method 800 may include operations such interfacing with a vehicle (block 804), selecting data from the data queue (block 806), transmitting the data to the vehicle (block 808), receiving an acknowledgment message (block 810), and deleting the data from the data queue (block 812). In an example embodiment, the vehicle can correspond to one of the TDS vehicles 206A-D of FIG. 2. The example method 800 will be described below, by way of explanation, as being performed by certain modules. It will be appreciated, however, that the operations of the example method 800 may be performed in any suitable order by any number of the modules shown in FIGS. 3 and 4.

The method 800 starts at block 802 and proceeds to block 804, wherein the communication module(s) 304 of the location server 300 interfaces communicatively with a first vehicle (e.g., one of the TDS vehicles 206A-D) for transmission of data. For example, the first vehicle can arrive at the location of the location server 300. As stated, the first vehicle can arrive at the location based on a route assigned to it by a master location 204A-D. As will be described later in connection with FIG. 9, the vehicle unit 400 can scan for a network provided by the communication module 304. In response to finding the network, the communication module(s) 304 of the server location 300 and communication module(s) 404 of the vehicle unit 400 create a communication link to interface the location server 300 and the vehicle unit 400.

At block 804, the file management module(s) 306 of the location server 300 selects data from a data queue, such as one of the destination data structures 506A, . . . , 506L of FIG. 5. The file management module(s) 306 selects the data based on the data being addressed for a destination location that matches a location included in the routing data of the first vehicle. To this end, for example, the first vehicle can provide to the file management module(s) 306 of the location server 300 routing data that includes the upcoming locations of the route of the first vehicle. The file management module(s) 306 compares the locations of the routing data to locations associated with each of the destination data structures 506A, . . . , 506L. Based on a match of locations, the file management module(s) 306 selects the file of the matched destination data structures 506A, . . . , 506L that has the highest priority. The selection can be performed in response to the communication interface module(s) 304 interfacing with a first vehicle for transmission of data.

At block 806, the file management module(s) 306 transmits the selected data to the first vehicle using the communication module(s) 304. Furthermore, the file management module(s) 306 moves the selected data from the data field TOSEND 508A, . . . , 508L to the data field SENT 510A, . . . , 510L. Transmission of data to the first vehicle will be described in greater detail later in connection with FIGS. 12-16.

In an example embodiment, after receiving the selected data, the first vehicle departs the first location and proceeds with its route. As will be described later in greater detail, the first vehicle arrives at the destination location and transfers the data to the destination location. In response to receiving the data, the destination location provides a second vehicle an ACK message to indicate that the destination location received the data. The first and second vehicle can be the same vehicle or different vehicles. The destination location select the second vehicle to receive the ACK message based at least partly on the second vehicle having routing data that is representative of a route that includes the source location. The second vehicle continues its route and arrives at the source location and interface with the communication module 304 of the location server 300.

At block 810, the file management module(s) 306 receives the ACK message from the second vehicle. As the acknowledgment message indicates that the first vehicle has provided the data to the location server at the destination location, the file management module(s) 306 deletes the first data from the data queue at block 812. For example, the file management module(s) 306 removes the selected data from the data field SENT 510A, . . . , 510L. At block 814, the method 800 ends.

Figure 9:
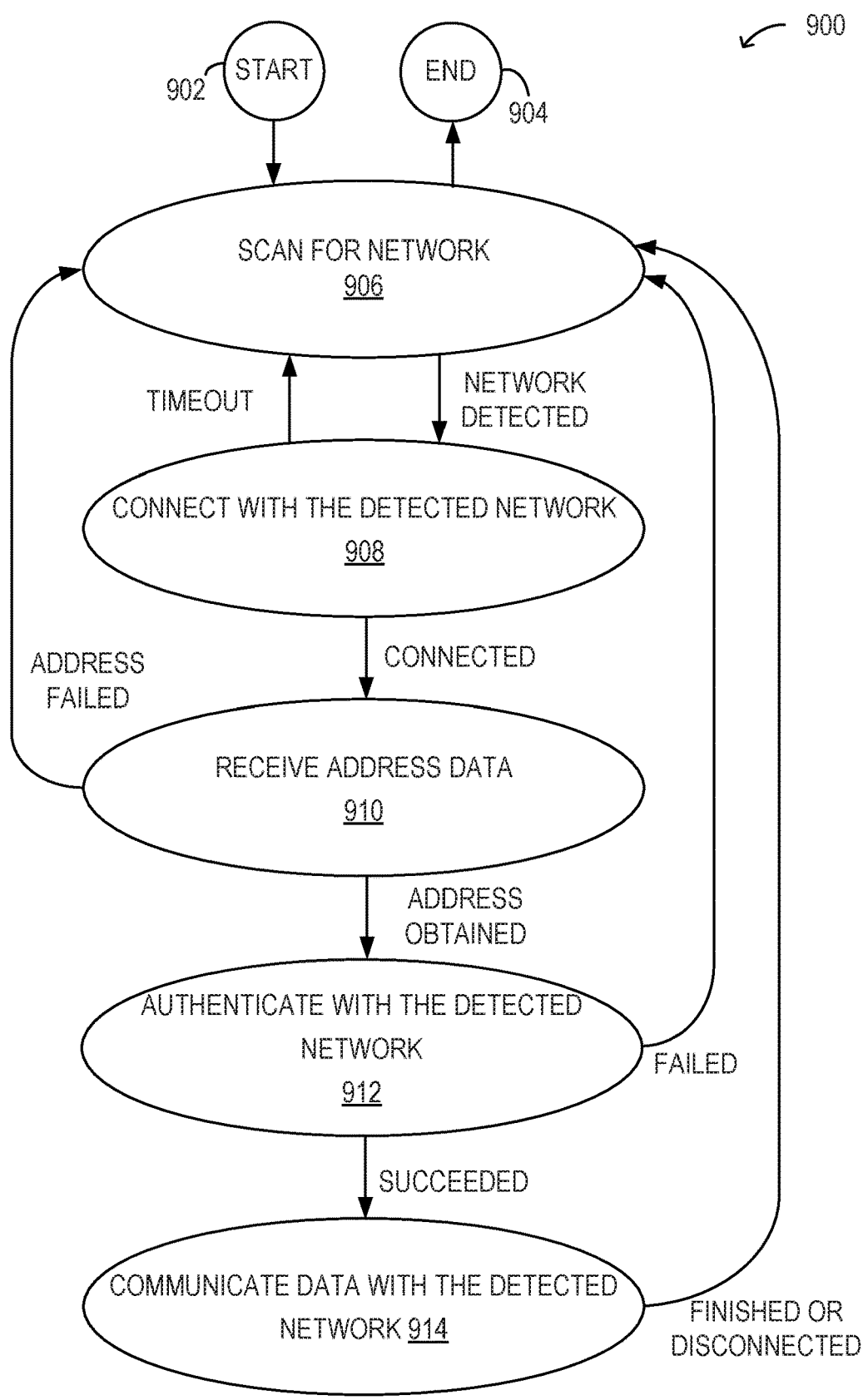
FIG. 9 is a state diagram illustrating actions, in accordance with an example embodiment, performed by a vehicle of the communication network of FIG. 2.

FIG. 9 is a state diagram 900 illustrating actions, in accordance with an example embodiment, performed by a vehicle (e.g., TDS vehicles 206A-D) of the communication network 200 of FIG. 2. From a start state 902, the vehicle unit 400 enters state 906, in which the vehicle unit 400 scans for a recognizable network. In an example embodiment, the vehicle unit 200 has a pre-loaded list of networks that it can recognize. The pre-loaded list can correspond to the networks of the master and regular locations of the communication system 200. For example, in the case that IEEE 802.11 wireless networks are used, the vehicle unit 200 has a list of servers set identifications (SSIDs) to look for. Any suitable wireless or wired network technology can be used. Therefore, the scanning procedure can vary depending on the specific standard used.

After detecting a recognized network, the vehicle unit 400 connects to the network in state 908. For instance, in an example embodiment a wired technology is used, and the vehicle unit 400 connects to the network by connecting a cable to the location's local network switch. If the vehicle unit 400 cannot connect to the detected network within a timeout period, the vehicle unit 400 reenters the state 906 to scan for a network.

At state 910, the vehicle unit 400 obtains address data, such as an IP address. In an example embodiment that uses DHCP, the vehicle unit 400 (e.g., using the communication module 304) broadcasts a request for an IP address. The communication module 304 waits for a reply from a DHCP server with an IP address that communication module 304 should use. Additionally or alternatively, static IP can be used, which can reduce the execution time of this activity.

When an IP address is successfully obtained (either via DHCP or statically), e.g., no conflicts with other local network entity addresses are detected, the vehicle unit 400 enters state 912, as described below. Otherwise, the vehicle unit 400 reenters state 906 to scan for a network.

In the state 912, the vehicle unit 400 performs the authentication with the location server 300. Authentication is performed in a way that the vehicle unit 400 proves its identity to the location server 300. Additionally or alternatively, the authentication is performed in a way that the location server 300 proves its identity to the vehicle unit 400. If the authentication process succeeds, the vehicle unit 400 enters state 914 for secure transmission and reception of data. The communication of data will be described in greater details below. Once communication is finished, or if communication is disconnected, the vehicle unit 400 reenters state 906 to scan for a network. The vehicle unit 400 can enter state 904 to end once the vehicle unit 400 completes.

At state 914, the vehicle unit 400 initializes with the location server 300 if the vehicle unit 400 does not have routing data and if the location server 300 corresponds to a master location. Initializing with a master location provides the vehicle unit 400 routing data. As stated, the master location stores routing data in a database and provides the routing data to TDS vehicle to control their respective sequence of locations to visit before the TDS vehicles returns to a master location.

An example embodiment, routes of the TDS vehicles are dynamic. As such, a TDS vehicle receives a new route containing all regular locations the TDS vehicle is to visit before the TDS vehicle returns back to a master location once more. If the route is static, the TDS vehicle receives the routing data once when the initialization process takes place. In the case of TDS vehicle restarting its hardware due to an exception, the TDS vehicle uses its last stored route information obtained from the master location as its current route.

Figure 10:
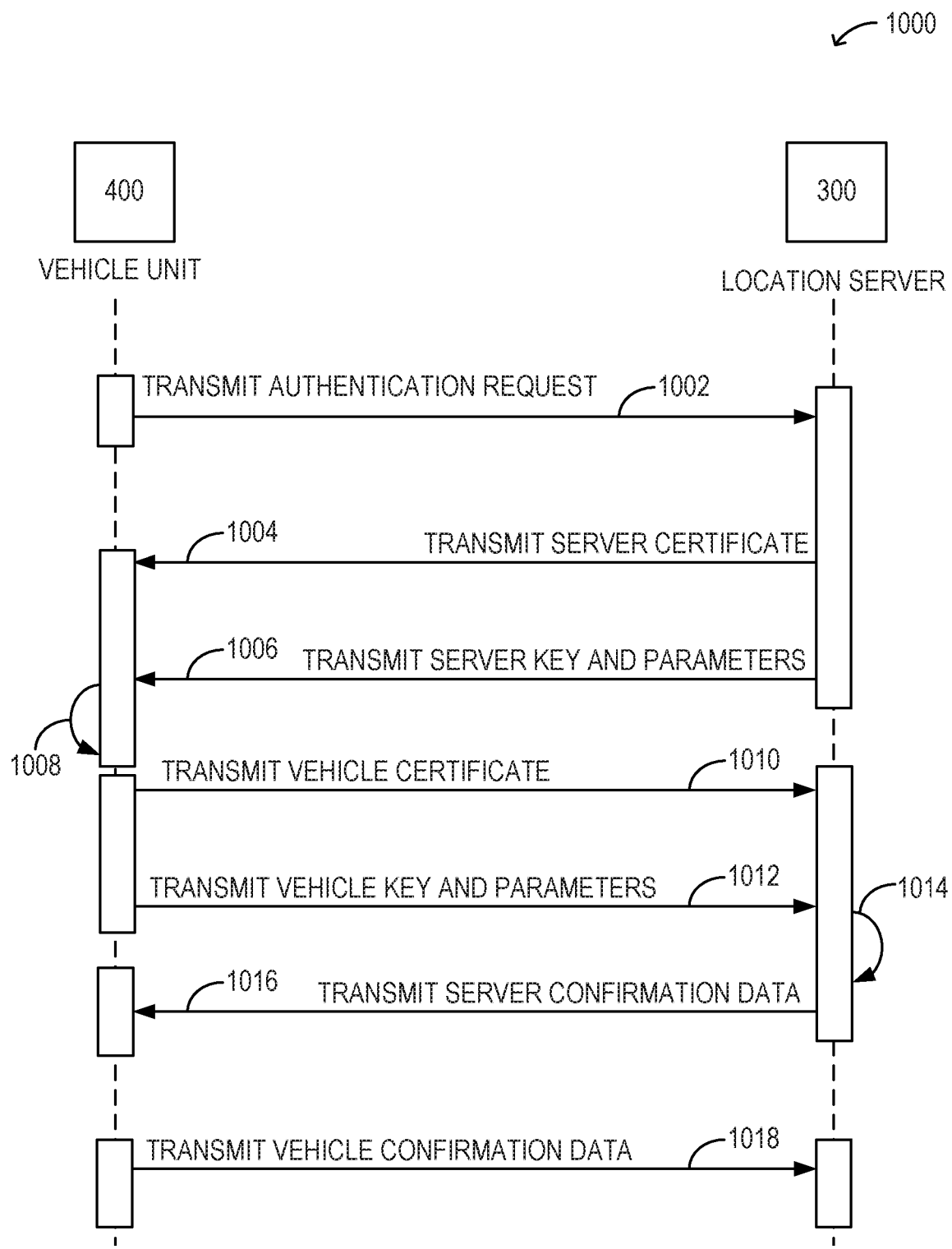
FIG. 10 is an interaction diagram illustrating a method, in accordance with an example embodiment, of authentication and secure data transfer setup.

FIG. 10 is an interaction diagram illustrating a method 1000, in accordance with an example embodiment, of authentication and secure data transfer setup. In particular, FIG. 10 illustrates interactions between a vehicle unit 400 of FIG. 4 and a location server 300 of FIG. 3.

At operation 1002, the vehicle unit 400 transmits an authentication request to the location server 300. For instance, the vehicle unit 400 and the location server 300 uses a security protocol that allows client and server authentication and data transfer security. In an example embodiment, a protocol utilizes certificates and asymmetric cryptography to authenticate the counterparty with which they are communicating. Furthermore, the protocol uses a symmetric cryptography to exchange asymmetric key to be used to encrypt data flowing between the parties.

At operation 1004, the location server 300 replies to the vehicle unit 400 by transmitting a server certificate to the vehicle unit 400. The server certificate is constituted by the server's identifier plus the server's public key signed by the certificate module(s) 312. Furthermore, at operation 1006, the location server 300 transmits the server's public keys and other parameters to the vehicle unit 400 for the vehicle unit 400 to cypher future communications with the location server 300.

At operation 1008, the vehicle unit 400, using the server's public key, verifies the server certificate and determines the vehicle unit's 400 public key. At operation 1010, the vehicle unit 400 transmits the vehicle unit's 400 certificate to the location server 300. Furthermore, the vehicle unit 400 transmits the vehicle's public key, parameters for secure communication, and a message that allows the location server 300 to explicitly verify the vehicle unit's 400 certificate.

At operation 1014, the location server 300 verifies the vehicle unit's certificate. At operation 1016, the location server 300 transmits a message that allows the vehicle unit 400 to verify whether the key exchange and authentication process succeeded. Likewise, at operation 1018, the vehicle unit 400 transmits a message that allows the location server 300 verify whether the key exchange and authentication process succeeded. In the case that both authentications succeeded, the transmission of data can start.

The operations of the method 1000 described above can be executed in a different order and additional or fewer steps can be used. An example of a protocol used in the method 1000 is SSL/TLS in case of TCP data transfers and DTLS in case of UDP data transfers. Alternatively, any protocol that provides peer authentication through certificates and message integrity and confidentiality can be used in implementations of this scheme.

Figure 11:
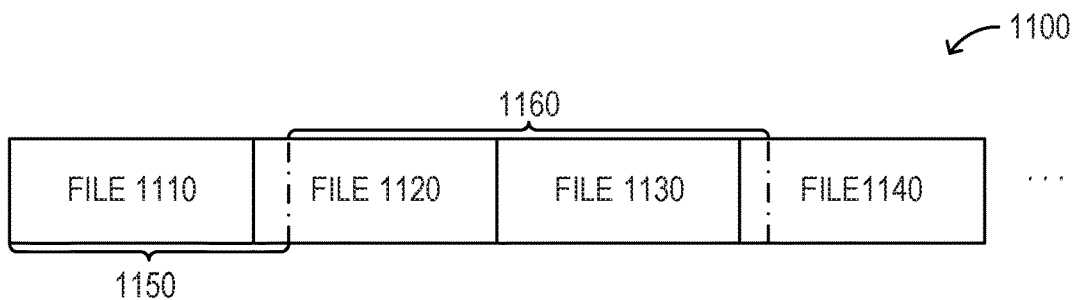
FIG. 11 is a block diagram illustrating a data structure, according to an example embodiment, representing files being transferred.

FIG. 11 is a block diagram illustrating a data structure 1100, according to an example embodiment, representing files 1110, 1120, 1130, 1140 that are transferring. As stated, the communication system 200 can transfer partial files. For instance, file 1110 and a first portion of file 1120 are transferred in a first transmission 1150 from a source location to a destination location via a TDS vehicle. In a second transmission 1160 from the source location to the destination location, the remainder of file 1120 and file 1130 are transmitted together. As shown, in an example embodiment, the first and the last files of a transmission can be transmitted partially, and both the data transferred and their corresponding ACK messages should indicate partial transmission in this situation.

Figure 12:
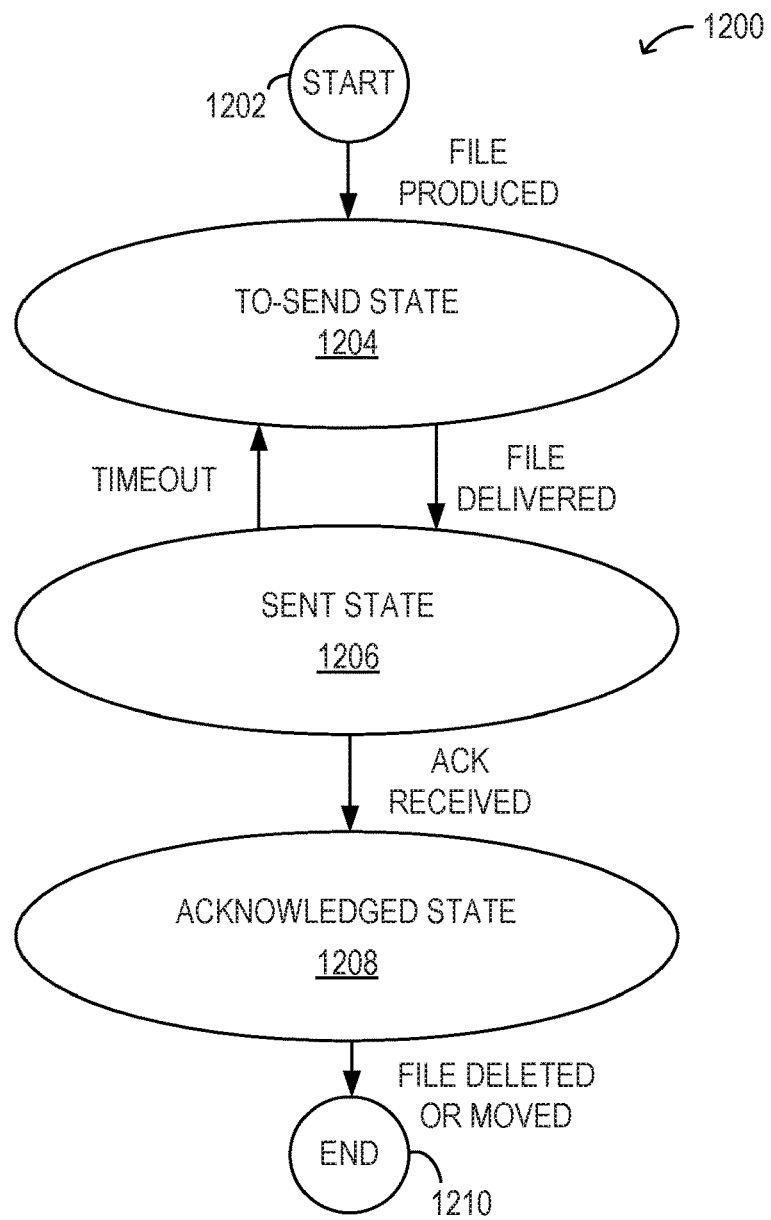
FIG. 12 is a state diagram illustrating actions, in accordance with an example embodiment, performed by a location server of the communication network of FIG. 2.

FIG. 12 is a state diagram illustrating actions 1200, in accordance with an example embodiment, performed by a location server of the communication network 200 of FIG. 2.

The file management module 306 of the location server 300 can maintain states of the produced files. For example, as stated above, a produced file or parts of a produced file can have two states. A first state 1204 is the to-send state, in which the file or parts of it were produced (e.g., at state 1202) at the source location but were not yet delivered to a TDS vehicle to transport it to their destination location. The second state 1206 is the sent state, in which the file or parts of it were delivered to a TDS vehicle but a corresponding ACK message has not been received yet. After an ACK message is received, the file enters state 1208 and can be moved to a separate directory or deleted, thereby completing at state 1210. However, after a period of time in the sent state without receiving an ACK message, the file is sent back from the sent state 1206 to the to-send state 1204. Accordingly, the file can be retransmitted.

Figures 13, 14, 15:
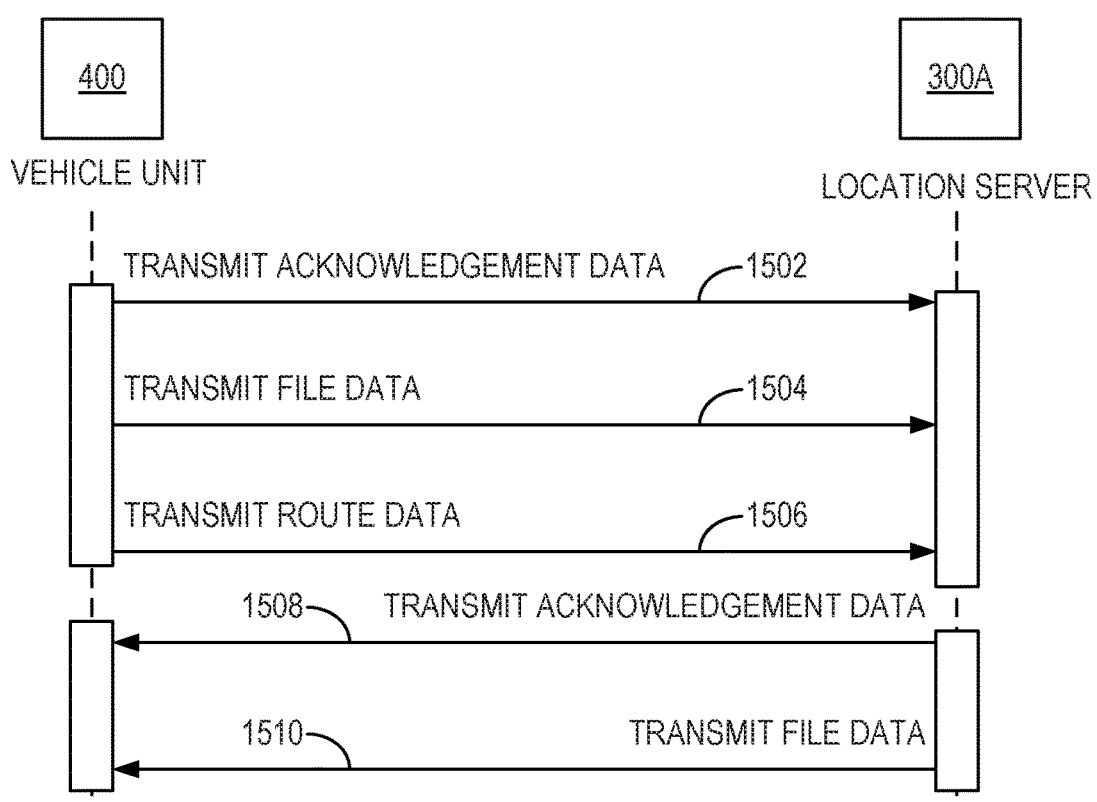
FIG. 13 is a block diagram illustrating a data structure, according to an example embodiment, representing the states of files being transferred.
FIG. 14 is a block diagram illustrating a data structure, according to an example embodiment, representing routing data.
FIGS. 15 and 16 are interaction diagrams illustrating methods, in accordance with example embodiments, of data communications between a vehicle unit and location server.

FIG. 13 is a block diagram illustrating a data structure 1300, according to an example embodiment, representing the states of files being transferred. For example, the file management module(s) 306 utilizes the data structure 1300 to track files that have been transmitted partially and/or to track ACK messages that are generated because of partial file transmissions. The data structure 1300 can be used in a number of ways. For example, the data structure 1300 can be used to indicate which portions of a file have been transmitted, which portions of the file that a particular ACK message references, and/or which portions of the file have received ACK messages.

In an example embodiment, the data structure 1300 is an array of bits and the data structure 300 is linked to a file. Each bit represents whether a piece of the linked file has been sent or not. For example, a value "1" at the i-th bit of this array indicates that the i-th piece of the linked file has been sent. A value "0" at the i-th bit of the array indicates that the i-th piece of the file has not been sent.

In another example embodiment, the data structure 1300 is an array of bits and the data structure 300 is linked to an ACK message. Each bit represents which portion of a sent file the ACK refers to. For example, a value "1" at the i-th bit of this array indicates that the ACK message acknowledges receipt of the i-th portion of the sent file. A value "0" at the i-th bit of the array indicates that the ACK message is not acknowledging receipt of the i-th portion of the sent file. In this way, a single ACK message can be used to acknowledge multiple partial file transfers.

In yet another example embodiment, the data structure 1300 is an array of bits and the data structure 300 is linked to a sent file. Each bit represents whether a piece of the linked file has received a corresponding ACK message or not. For example, a value "1" at the i-th bit of this array indicates that the i-th piece of the linked file has received a corresponding ACK message. A value "0" at the i-th bit of the array indicates that the i-th piece of the file has not received a corresponding ACK message.

FIG. 14 is a block diagram illustrating a data structure 1400, according to an example embodiment, representing routing data. For instance, a TDS vehicle can use the data structure 1400 to represent the TDS vehicle's route. As stated, the data structure 1400 can be initially generated by a master location and is provided to the TDS vehicle by the master location. Furthermore, the TDS vehicle provides the data structure 1400 to each location (e.g., master and/or regular location) it visits. The data structure 1400 can correspond to a variable-sized vector of integers (or any equivalent structure used to represent a location's unique ID). For example, the data structure 1400 includes seven integers indexed one through seven. The value of each integer can correspond to a unique identifier usable to identify a location of the communication system 200. Moreover, the data structure 1400 orders the integers to represent the chronological order of the destinations of the route. As the TDS vehicle visits a location indicated by the data structure 1400, the TDS vehicle to remove the integer corresponding to the location from the data structure 1400.

Figure 16:
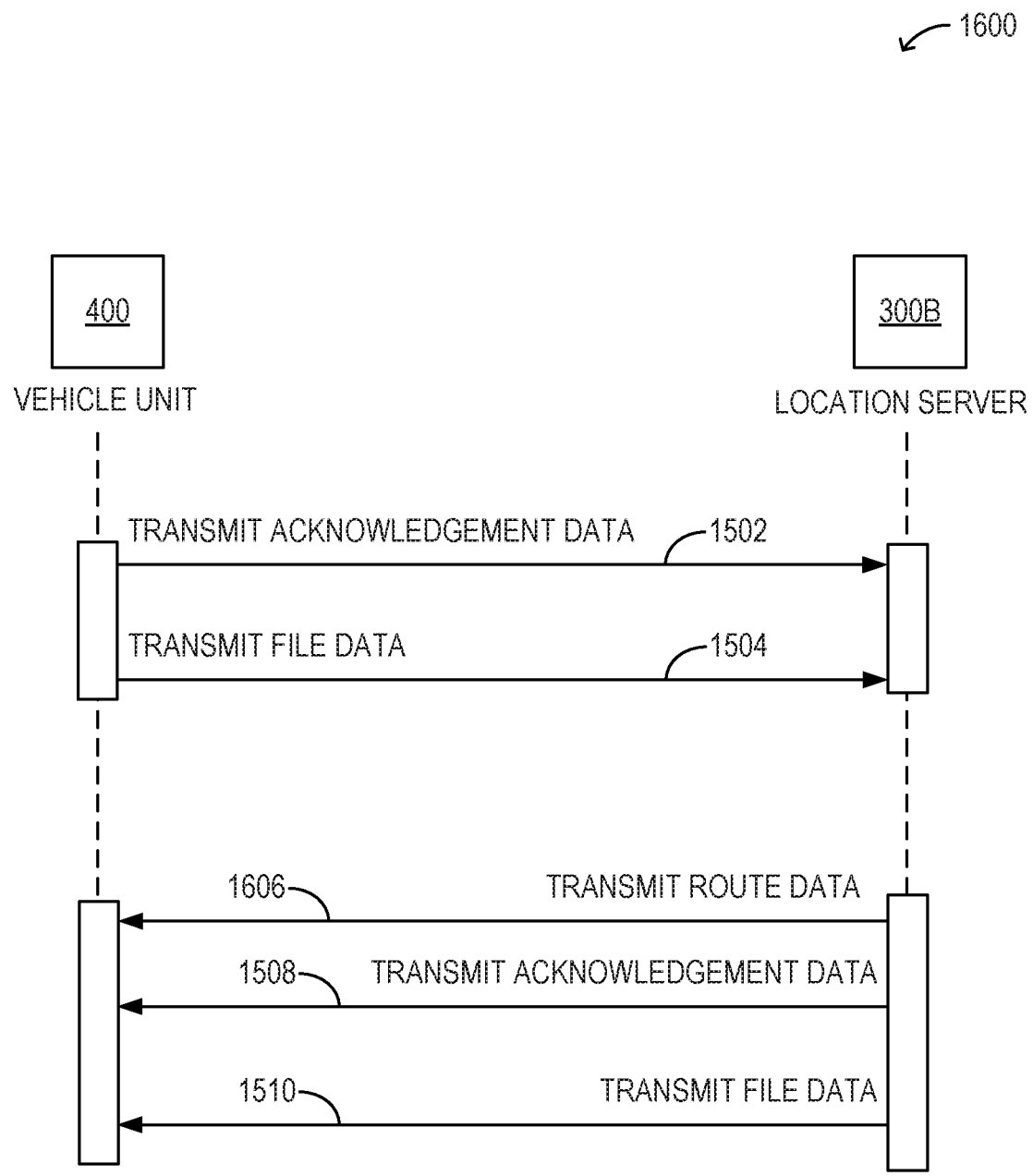

FIGS. 15 and 16 are interaction diagrams illustrating methods 1500, 1600, in accordance with example embodiments, of data communications between a vehicle unit 400 and a location server 300A, 300B. In example embodiments, FIG. 15 describes communications between a TDS vehicle and a location server 330A of a regular location of the communication system 200, and FIG. 16 describes vacations between a TDS vehicle and a location server 300B of a master location of the communication system 200.

With reference to FIG. 15, in response to a TDS vehicle arriving at a regular location of the communication system 200, there is an exchange of data (e.g., files), ACK messages, and routing data between the TDS vehicle and the location after the authentication process is concluded, as stated in connection with FIGS. 9 and 10. In an example embodiment, the data exchange described herein is encrypted. In one aspect, the specific way the data, ACK messages, and routing data are exchanged is part of the punctual transmission scheme.

At operation 1502, the vehicle unit 400 of the TDS vehicle transmits acknowledgment data to the location server 300A of the regular location. The acknowledgment data correspond to the ACK messages (e.g., the ACK_FILEs) stored in the transported acknowledgments 620 of FIG. 6 that correspond to the regular location. In particular, the vehicle unit 400 locates the destination data structure 622A, . . . , 622Z that matches the current regular location.

At operation 1504, the vehicle unit 400 of the TDS vehicle transmits file data to the location server 300A of the regular location. The file data correspond to the files stored in the transported data 602 of FIG. 6 to the regular location. In particular, the vehicle unit 400 locates the destination data structure 604A, . . . , 604Z that matches the current regular location.

At operation 1506, the vehicle unit 400 of the TDS vehicle transmits routing data to the location server 300A of the current regular location. The routing data can correspond to the data structure 1400 described above in connection with FIG. 14.

At operation 1508, the location server 300A transmits to the vehicle unit 400 acknowledgment data (ACK messages) based on the next locations that the TDS vehicle will pass after leaving the current regular location. For instance, the location server 300A stores ACK messages in the acknowledgment data 520 of FIG. 5. The particular ACK messages selected by the location server 300A from the acknowledgment data 520 is based on matching the destinations of the routing data received from the vehicle unit 400 to the destination data fields 522A, . . . , 522L.

At operation 1510, the location server 300A transmits to the vehicle unit 400 of the TDS vehicle file data selected based on the next locations that the TDS vehicle will pass after leaving the current regular location. For instance, the location server 300A stores files for transmission in the produced data 504 of FIG. 5. The particular files selected by the location server 300A from the produced data 504 is based on matching the destinations of the routing data received from the vehicle unit 400 to the destination data fields 506A, . . . , 506L.

By transmitting data from the vehicle unit 400 to the location server 300A before transmitting data from the location server 300A to the vehicle unit 400, the vehicle unit 400 makes the efficient use of limited memory resources (e.g., storage capacity of the vehicle unit 400).

With reference to FIG. 16, the sequence of data/messages exchanged between the vehicle unit 400 and a master location is similar to the sequence described above in connection with FIG. 15. Accordingly, FIGS. 15 and 16 share common reference indicia, and only differences between the figures are described herein for the sake of brevity. For example, an example difference is that operation 1606 the location server 300B transmits routing data to the vehicle unit 400 instead of the vehicle unit 400 transmitting routing data to the location server 300B. This sequence is because the master location server 300B, unlike some regular locations, has the routing data of the vehicle unit 400 and updates the vehicle unit 400 with the routing data.

In example embodiments, the total amount of bytes in the files to be transferred is greater than the amount of bytes in the ACK messages and routing data. ACK messages and routing data can be transmitted atomically, using a connection-oriented transport layer protocol, such as TCP, in example embodiments. On the other hand, file data transmission can use alternative protocols, e.g., a datagram-oriented transport layer, with their own reliability control and congestion control mechanisms implemented on the application layer.

An example embodiment, before transmitting a file, the location server 300B of a source location divides the file into fixed-size pieces. After dividing the file into pieces, the location server 300B sends the file in a piecewise fashion or in its entirety. The destination location sends ACK messages to indicate which pieces of the file were received. In case some pieces of the file were not received by the destination location, the location server 300B of the source location sends the dropped pieces again. This process repeats until all pieces of the file have their receipt confirmed by the destination location. In one example embodiment, the location server 300B proceeds to split and transmit the next file in response to confirmation of complete receipt of the complete first file.

In the case that the source location has only some pieces of a file, the specific pieces it contains should be informed in the beginning of the transmission of the file. In the case that this communication is interrupted when pieces of one file are being transmitted, the source location should consider that the destination location received all pieces of the file that were confirmed in the destination location's confirmation report.

The protocol used for transmitting the files can be chosen based on implementation details. Example protocols such as the Trivial File Transfer Protocol (TFTP), the Tsunami UDP Protocol, the User Datagram Protocol-based Data Transfer Protocol (UDT), and the User Datagram Protocol-based FTP with Multicast Protocol (UFTP) can be used or adapted for this purpose.

Figure 17:
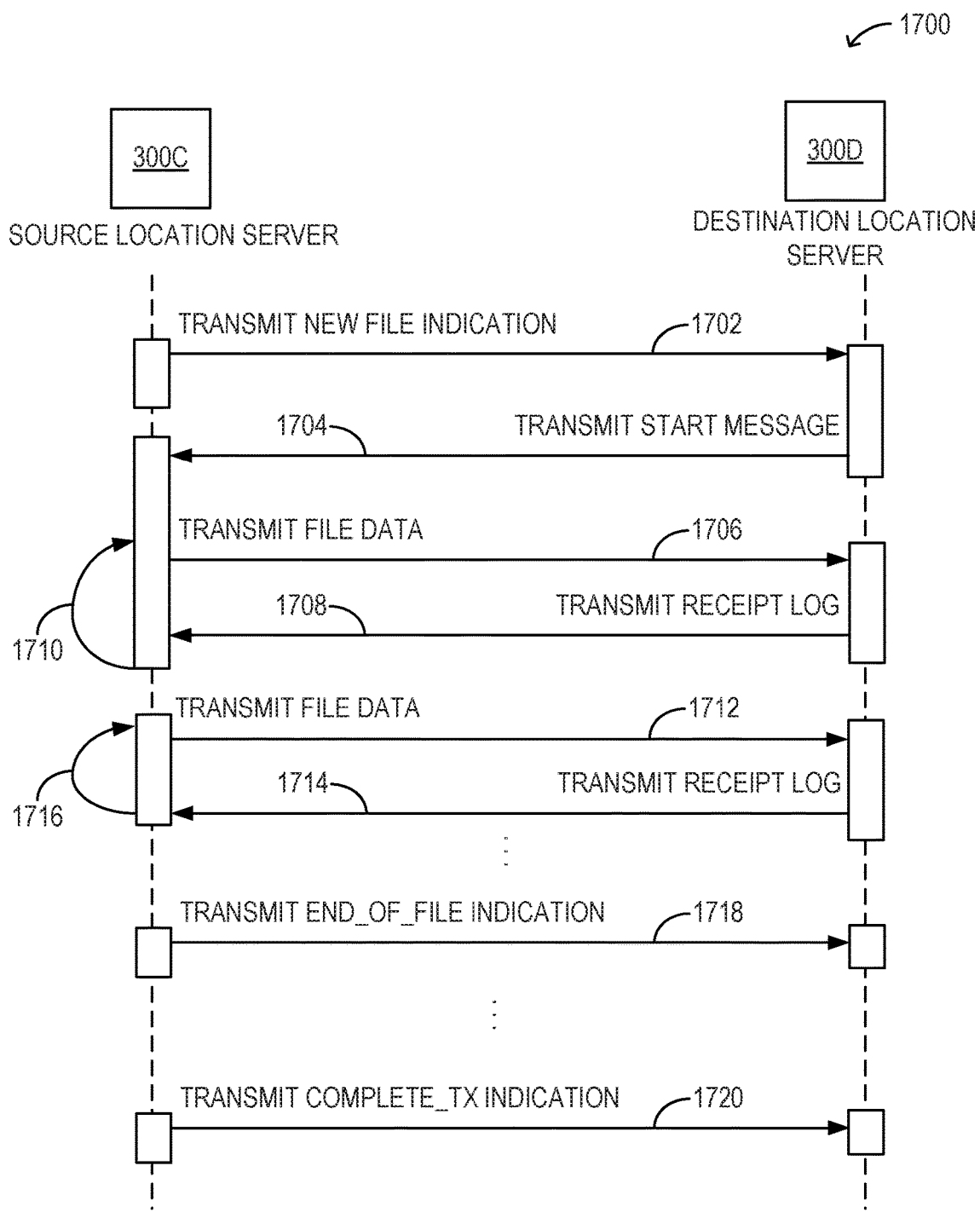
FIG. 17 is an interaction diagram illustrating a method, in accordance with an example embodiment, of endpoint communication.

FIG. 17 is an interaction diagram illustrating a method 1700, in accordance with an example embodiment, of endpoint communication. In particular, FIG. 1700 illustrates interactions a source location server 300C and a destination location server 300D of FIG. 3. Communication between the source location server 300C and the destination location server 300D can be performed using one or more TDS vehicles as data carriers as described above.

At operation 1702, the source location server 300C transmits a new file indication to the destination location server 300D. At operation 1704, in response to the destination location server 300 receiving the new file indication, the destination location server 300D transmits a start message to the source location server 300C to indicate that the destination location server 300D is ready to receive the new file.

After receiving the transmit start message, the source location server 300C transmits file data to the destination location server 300D at operation 1706. In an example embodiment, the source location server 300C splits the new file into one or more pieces. For instance, the source location server 300C can split the new file into pieces having a fixed size. In this way, splitting the file into multiple pieces can facilitate transmission of large data files.

In response to a successful transmission of the transmitted file data, at operation 1708, the destination location server 300D transmits a receipt log to the source location server 300C. At operation 1710, the source location server 300C checks the transmitted receipt log to determine whether the transmission of operation 1706 was successful. In response to a determination that the transmission was not successful, the source location server 300C repeats operation 1706 to retransmit the file data until the file data transmission is successful. In response to a determination that the transmission of operation 1706 was successful, the source location server 300C continues to operation 1712, as described below.

At operations 1712, 1714, 1716, the source location server 300C and the destination location server 300D repeats the process of operations 1712, 1714, 1716 for a number of subsequent pieces, if any, of the file until the source location server 300C completes transmitting all the pieces of the file (or a timeout condition occurs). At the completion of transmitting all of the pieces of the file data, the source location server 300C transmits an end of file indication to the destination location server 300D to indicate to the destination location server 300D that the transmission of the file has been completed.

If there are additional files for the source location server 300C to transmit to the destination location server 300D, the operations of 1702-1718 can be repeated for the additional files. Once all files have been transmitted to the destination location server 300D, the source location server 300C transmits a complete transmission indication message to the destination location server 300D to indicate that the source location server has completed transmitting data files to the destination location server 300D.

Certain example embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as an FPGA, or an ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering example embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In example embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In example embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 18:
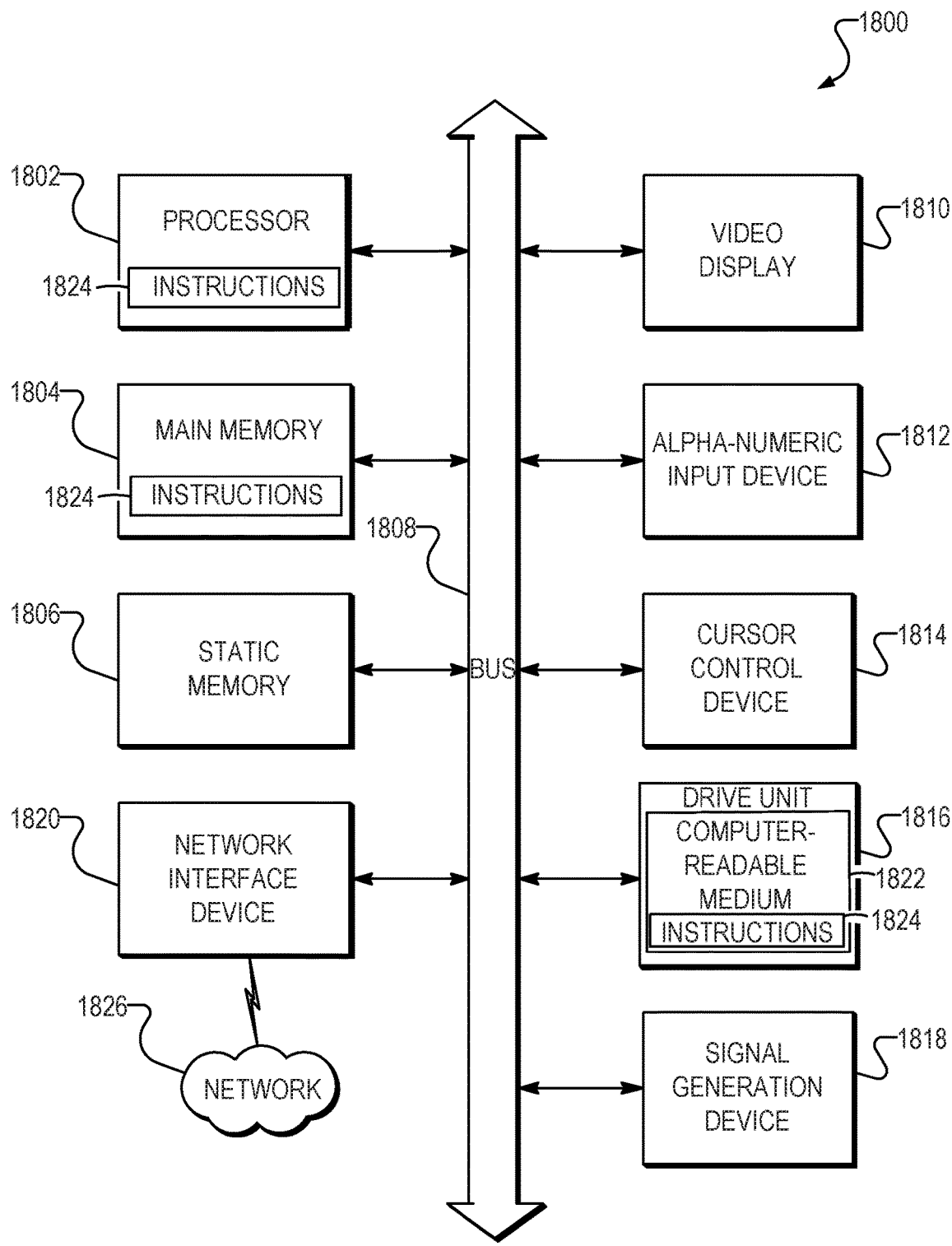
FIG. 18 is a block diagram of a machine in an example form of a computer system within which instructions may be executed for causing the machine to perform any one or more of the methodologies discussed herein.

FIG. 18 is a block diagram of a machine in the example form of a computer system 1800 within which instructions 1824 may be executed for causing the machine to perform any one or more of the methodologies discussed herein. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU), or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation (or cursor control) device 1814 (e.g., a mouse), a disk drive unit 1816, a signal generation device 1818 (e.g., a speaker), and a network The disk drive unit 1816 includes a computer-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, with the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any non-transitory, tangible medium that is capable of storing, encoding, or carrying instructions 1824 for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and digital optical disks such as compact disks (CDs) and digital video discs (DVDs).

The instructions 1824 may further be transmitted or received over a communications network 1826 using a transmission medium. The instructions 1824 may be transmitted using the network interface device 1820 and any one of a number of well-known transfer protocols (e.g., Hypertext Transfer Protocol (HTTP)). Examples of communication networks include a local area network (LAN), a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions (e.g., instructions 1824) for execution by the machine, and includes digital or analog communications signals or other intangible media to facilitate communication of such software.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A system comprising:
   one or more computer processors; and
   one or more computer-readable mediums storing instructions that, when executed by the one or more computer processors, cause the system to perform operations comprising:
   establishing communication with a first vehicle that is travelling to a destination location;
   transmitting, after establishing communication with the first vehicle, first data from a data queue to the first vehicle, the first data being addressed to the destination location;
   receiving, after the first data was received at the destination location, an acknowledgement message; and
   in response to receiving the acknowledgement message, deleting the first data from the data queue.

2. The system of claim 1, wherein the data queue comprises:
   a first list of files to be sent to the destination location; and
   a second list of files that have been sent to the destination location.

3. The system of claim 2, the operations further comprising:
   accessing, from a data storage device, a list of routing destinations; and
   selecting the first data from the first list in response determining that the destination location of the first list matches at least one destination from the list of routing destinations.

4. The system of claim 2, the operations further comprising:
   receiving, from the first vehicle, a list of routing destinations; and
   selecting the first data from the first list in response to determining that the destination location of the first list matches at least one destination from the list of routing destinations.

5. The system of claim 2, the operations further comprising:
   in response to the transmitting the first data to the first vehicle, removing the first data from the first list, and adding the first data to the second list, wherein deleting the first data from the data queue corresponds to deleting the first data from the second list.

6. The system of claim 1, wherein the acknowledgement message is received from a second vehicles that is different than the first vehicle.

7. The system of claim 1, wherein the acknowledgement message is received from the first vehicle.

8. The system of claim 1, the operations further comprising:
   receiving a vehicle identifier from a registering vehicle;
   generating a public key, a private key, and a certificate for authentication; and
   transmitting the public key, the private key, and the certificate to the registering vehicle.

9. The system of claim 1, wherein the acknowledgment message include first and second identifiers, the first identifier being usable to identify a source location of the acknowledgment message, the second identifier being usable to identify the first data.

10. A computer-implemented method comprising:
- establishing, via a processing device, communication with a first vehicle that is travelling to a destination location;
- transmitting, after establishing communication with the first vehicle and via the processing device, first data from a data queue to the first vehicle, the first data being addressed to the destination location;
- receiving, after the first data was received at the destination location and via the processing device, an acknowledgement message; and
- in response to receiving the acknowledgement message, deleting, via the processing device, the first data from the data queue.

11. The computer-implemented method of claim 10, wherein the data queue comprises:
- a first list of files to be sent to the destination location; and
- a second list of files that have been sent to the destination location.

12. The computer-implemented method of claim 11, further comprising:
- accessing, from a data storage device via the processing device, a list of routing destinations; and
- selecting, via the processing device, the first data from the first list in response determining that the destination location of the first list matches at least one destination from the list of routing destinations.

13. The computer-implemented method of claim 11, further comprising:
- receiving, from the first vehicle via the processing device, a list of routing destinations; and
- selecting, via the processing device, the first data from the first list in response to determining that the destination location of the first list matches at least one destination from the list of routing destinations.

14. The computer-implemented method of claim 11, further comprising:
- in response to the transmitting the first data to the first vehicle, removing, via the processing device, the first data from the first list, and adding, via the processing device, the first data to the second list, wherein deleting the first data from the data queue corresponds to deleting the first data from the second list.

15. The computer-implemented method of claim 10, wherein the acknowledgement message is received from a second vehicles that is different than the first vehicle.

16. The computer-implemented method of claim 10, wherein the acknowledgement message is received from the first vehicle.

17. The computer-implemented method of claim 10, further comprising:
- receiving, via the processing device, a vehicle identifier from a registering vehicle;
- generating, via the processing device, a public key, a private key, and a certificate for authentication; and
- transmitting, via the processing device, the public key, the private key, and the certificate to the registering vehicle.

18. The computer-implemented method of claim 10, wherein the acknowledgment message include first and second identifiers, the first identifier being usable to identify a source location of the acknowledgment message, the second identifier being usable to identify the first data.

19. A non-transitory computer-readable medium storing instructions that, when executed by one or more computer processors of computing device, cause the computing device to perform operations comprising:
- establishing communication with a first vehicle that is travelling to a destination location;
- transmitting, after establishing communication with the first vehicle, first data from a data queue to the first vehicle, the first data being addressed to the destination location;
- receiving, after the first data was received at the destination location, an acknowledgement message; and
- in response to receiving the acknowledgement message, deleting the first data from the data queue.

20. The non-transitory computer-readable medium of claim 19, wherein the acknowledgement message is received from a second vehicles that is different than the first vehicle.

* * * * *